(12) United States Patent
Hirata et al.

(10) Patent No.: US 6,342,929 B1
(45) Date of Patent: Jan. 29, 2002

(54) PROJECTION IMAGE DISPLAY APPARATUS

(75) Inventors: Koji Hirata, Yokohama; Kazunari Nakagawa, Ebina; Tomoharu Nakiri, Yokohama; Naoyuki Ogura, Ebina; Chihiro Egawa, Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/598,047

(22) Filed: Jun. 21, 2000

Related U.S. Application Data

(62) Division of application No. 08/997,761, filed on Dec. 24, 1997.

(30) Foreign Application Priority Data

Dec. 27, 1996 (JP) .............................................. 8-351154

(51) Int. Cl.[7] ................................................. H04N 9/31
(52) U.S. Cl. ........................ 348/779; 348/778; 359/460
(58) Field of Search ............................. ; 348/832, 835, 348/744, 750, 778, 776, 779, 781, 786; 359/443, 445, 452, 446, 453, 447, 460; H04N 9/31

(56) References Cited

U.S. PATENT DOCUMENTS 4,502,755 A * 3/1985 Mori et al.
5,434,706 A * 7/1995 Mitani et al.

FOREIGN PATENT DOCUMENTS

| JP | 1-175601 | * | 8/1986 |
| JP | 3-224384 | | 10/1991 |
| JP | 7-30912 | * | 1/1995 |

* cited by examiner

Primary Examiner—David E. Harvey
(74) Attorney, Agent, or Firm—Mattingly, Stanger & Malur, P.C.

(57) ABSTRACT

The projection image display apparatus includes a plurality of image generating sources for generating three primary colors, including red, green, blue image light, respectively, and a projection lens containing a plurality of lens elements provided in correspondence with each of said image generating sources for enlarging/projecting images displayed by the image generating sources onto a screen. The projection lens corresponding to the red image generating source includes a light transmitter that satisfies the condition: TRS<TRL/3, wherein TRS is the transmittance with respect to a wavelength $\lambda$ RSmax of sub-peak energy of a spurious component existing in a short-wavelength-sided region rather than a peak energy waveform $\lambda$ Rmax of a spectral distribution of the red image light, and TRL is the transmittance with respect to a wavelength $\lambda$ RLmax of sub-peak energy of a spurious component existing in a long-wavelength-sided region rather than the peak energy wavelength $\lambda$ Rmax of the spectral distribution of the red image light.

14 Claims, 18 Drawing Sheets

| WAVE-LENGTH λ (nm) | SPECTRAL TRISTIMULUS VALUES | | | WAVE-LENGTH λ (nm) | SPECTRAL TRISTIMULUS VALUES | | |
|---|---|---|---|---|---|---|---|
| | $\bar{x}\lambda$ | $\bar{y}\lambda$ | $\bar{z}\lambda$ | | $\bar{x}\lambda$ | $\bar{y}\lambda$ | $\bar{z}\lambda$ |
| 380 | 0.0014 | 0.0000 | 0.0065 | 580 | 0.9163 | 0.8700 | 0.0017 |
| 385 | 0.0022 | 0.0001 | 0.0105 | 585 | 0.9786 | 0.8163 | 0.0014 |
| 390 | 0.0042 | 0.0001 | 0.0201 | 590 | 1.0263 | 0.7570 | 0.0011 |
| 395 | 0.0076 | 0.0002 | 0.0362 | 595 | 1.0567 | 0.6949 | 0.0010 |
| 400 | 0.0143 | 0.0004 | 0.0679 | 600 | 0.0622 | 0.6310 | 0.0008 |
| 405 | 0.0232 | 0.0006 | 0.1102 | 605 | 1.0456 | 0.5668 | 0.0006 |
| 410 | 0.0435 | 0.0012 | 0.2074 | 610 | 1.0026 | 0.5030 | 0.0003 |
| 415 | 0.0776 | 0.0022 | 0.3713 | 615 | 0.9384 | 0.4412 | 0.0002 |
| 420 | 0.1344 | 0.0040 | 0.6456 | 620 | 0.8544 | 0.3810 | 0.0002 |
| 425 | 0.2148 | 0.0073 | 1.0391 | 625 | 0.7514 | 0.3210 | 0.0001 |
| 430 | 0.2839 | 0.0116 | 1.3856 | 630 | 0.6424 | 0.2650 | 0.0000 |
| 435 | 0.3285 | 0.0168 | 1.6230 | 635 | 0.5419 | 0.2170 | 0.0000 |
| 440 | 0.3483 | 0.0230 | 1.7471 | 640 | 0.4479 | 0.1750 | 0.0000 |
| 445 | 0.3481 | 0.0298 | 1.7826 | 645 | 0.3608 | 0.1382 | 0.0000 |
| 450 | 0.3362 | 0.0380 | 1.7721 | 650 | 0.2835 | 0.1070 | 0.0000 |
| 455 | 0.3187 | 0.0480 | 1.7441 | 655 | 0.2187 | 0.0816 | 0.0000 |
| 460 | 0.2908 | 0.0600 | 1.6692 | 660 | 0.1649 | 0.0610 | 0.0000 |
| 465 | 0.2511 | 0.0739 | 1.5281 | 665 | 0.1212 | 0.0446 | 0.0000 |
| 470 | 0.1954 | 0.0910 | 1.2876 | 670 | 0.0874 | 0.0320 | 0.0000 |
| 475 | 0.1421 | 0.1126 | 1.0419 | 675 | 0.0636 | 0.0232 | 0.0000 |
| 480 | 0.0956 | 0.1390 | 0.8130 | 680 | 0.0468 | 0.0170 | 0.0000 |
| 485 | 0.0580 | 0.1693 | 0.6162 | 685 | 0.0329 | 0.0119 | 0.0000 |
| 490 | 0.0320 | 0.2080 | 0.4652 | 690 | 0.0227 | 0.0082 | 0.0000 |
| 495 | 0.0147 | 0.2586 | 0.3533 | 695 | 0.0158 | 0.0057 | 0.0000 |
| 500 | 0.0049 | 0.3230 | 0.2720 | 700 | 0.0114 | 0.0041 | 0.0000 |
| 505 | 0.0024 | 0.4073 | 0.2123 | 705 | 0.0081 | 0.0029 | 0.0000 |
| 510 | 0.0093 | 0.5030 | 0.1582 | 710 | 0.0058 | 0.0021 | 0.0000 |
| 515 | 0.0291 | 0.6082 | 0.1117 | 715 | 0.0041 | 0.0015 | 0.0000 |
| 520 | 0.0633 | 0.7100 | 0.0782 | 720 | 0.0029 | 0.0010 | 0.0000 |
| 525 | 0.1096 | 0.7932 | 0.0573 | 725 | 0.0020 | 0.0007 | 0.0000 |
| 530 | 0.1655 | 0.8620 | 0.0422 | 730 | 0.0014 | 0.0005 | 0.0000 |
| 535 | 0.2257 | 0.9149 | 0.0298 | 735 | 0.0010 | 0.0004 | 0.0000 |
| 540 | 0.2904 | 0.9540 | 0.0203 | 740 | 0.0007 | 0.0003 | 0.0000 |
| 545 | 0.3597 | 0.9803 | 0.0134 | 745 | 0.0005 | 0.0002 | 0.0000 |
| 550 | 0.4334 | 0.9950 | 0.0087 | 750 | 0.0003 | 0.0001 | 0.0000 |
| 555 | 0.5121 | 1.0002 | 0.0057 | 755 | 0.0002 | 0.0001 | 0.0000 |
| 560 | 0.5945 | 0.9950 | 0.0039 | 760 | 0.0002 | 0.0001 | 0.0000 |
| 565 | 0.6784 | 0.9786 | 0.0027 | 765 | 0.0001 | 0.0000 | 0.0000 |
| 570 | 0.7621 | 0.9520 | 0.0021 | 770 | 0.0001 | 0.0000 | 0.0000 |
| 575 | 0.8425 | 0.9154 | 0.0018 | 775 | 0.0000 | 0.0000 | 0.0000 |
| | | | | 780 | 0.0000 | 0.0000 | 0.0000 |
| | | | | | 21.3713 | 21.3714 | 21.3715 |

FIG.5

| WAVE-LENGTH λ (nm) | SPECTRAL TRISTIMULUS VALUES | | | WAVE-LENGTH λ (nm) | SPECTRAL TRISTIMULUS VALUES | | |
|---|---|---|---|---|---|---|---|
| | $(\bar{x}_{10})\lambda$ | $(\bar{y}_{10})\lambda$ | $(\bar{z}_{10})\lambda$ | | $(\bar{x}_{10})\lambda$ | $(\bar{y}_{10})\lambda$ | $(\bar{z}_{10})\lambda$ |
| 380 | 0.0002 | 0.0000 | 0.0007 | 580 | 1.0142 | 0.8689 | 0.0000 |
| 385 | .0007 | .0001 | .0029 | 585 | 1.0743 | .8256 | |
| 390 | .0024 | .0003 | .0105 | 590 | 1.1185 | .7774 | |
| 395 | .0072 | .0008 | .0323 | 595 | 1.1343 | .7204 | |
| 400 | .0191 | .0020 | .0860 | 600 | 1.1240 | .6583 | |
| 405 | .0434 | .0045 | .1971 | 605 | 1.0891 | .5939 | |
| 410 | .0847 | .0088 | .3894 | 610 | 1.0305 | .5280 | |
| 415 | .1406 | .0145 | .6568 | 615 | 0.9507 | .4618 | |
| 420 | .2045 | .0214 | .9725 | 620 | .8563 | .3981 | |
| 425 | .2647 | .0295 | 1.2825 | 625 | .7549 | .3396 | |
| 430 | .3147 | .0387 | 1.5535 | 630 | .6475 | .2835 | |
| 435 | .3577 | .0496 | 1.7985 | 635 | .5351 | .2283 | |
| 440 | .3837 | .0621 | 1.9673 | 640 | .4316 | .1798 | |
| 445 | .3867 | .0747 | 2.0273 | 645 | .3437 | .1402 | |
| 450 | .3707 | .0895 | 1.9948 | 650 | .2683 | .1076 | |
| 455 | .3430 | .1063 | 1.9007 | 655 | .2043 | .0812 | |
| 460 | .3023 | .1282 | 1.7454 | 660 | .1526 | .0603 | |
| 765 | .2541 | .1528 | 1.5549 | 665 | .1122 | .0441 | |
| 470 | .1956 | .1852 | 1.3176 | 670 | .0813 | .0318 | |
| 475 | .1323 | .2199 | 1.0302 | 675 | .0579 | .0226 | |
| 480 | .0805 | .2536 | 0.7721 | 680 | .0409 | .0159 | |
| 485 | .0411 | .2977 | .5701 | 685 | .0286 | .0111 | |
| 490 | .0162 | .3391 | .4153 | 690 | .0199 | .0077 | |
| 495 | .0051 | .3954 | .3024 | 695 | .0138 | .0054 | |
| 500 | .0038 | .4608 | .2185 | 700 | .0096 | .0037 | |
| 505 | .0154 | .5314 | .1592 | 705 | .0066 | .0026 | |
| 510 | .0375 | .6067 | .1120 | 710 | .0046 | .0018 | |
| 515 | .0714 | .6857 | .0822 | 715 | .0031 | .0012 | |
| 520 | .1177 | .7618 | .0607 | 720 | .0022 | .0008 | |
| 525 | .1730 | .8233 | .0431 | 725 | .0015 | .0006 | |
| 530 | .2365 | .8752 | .0305 | 730 | .0010 | .0004 | |
| 535 | .3042 | .9238 | .0206 | 735 | .0007 | .0003 | |
| 540 | .3768 | .9620 | .0137 | 740 | .0005 | .0002 | |
| 545 | .4516 | .9822 | .0079 | 745 | .0004 | .0001 | |
| 550 | .5298 | .9918 | .0040 | 750 | .0003 | .0001 | |
| 555 | .6161 | .9991 | .0011 | 755 | .0002 | .0001 | |
| 560 | .7052 | .9973 | .0000 | 760 | .0001 | .0000 | |
| 565 | .7938 | .9824 | | 765 | .0001 | | |
| 570 | .8787 | .9555 | | 770 | .0001 | | |
| 575 | 0.9512 | .9152 | | 775 | .0000 | | |
| 580 | 1.0142 | .8689 | | 780 | .0000 | | |
| | | | | TOTALS: | 23.3294 | 23.3323 | 23.3343 |

| | LENS PLANE | RADIUS OF CONVATER RD | FACE INTERVAL | ABBE'S NUMBER νd/ INDEX |
|---|---|---|---|---|
| SCREEN | | ∞ | 1042.6 | 1.0 |
| FIRST LENS | S₁ | 112.98 | 8.874 | 57.9/1.49334 |
| | S₂ | 415.40 | 17.286 | 1.0 |
| SECOND LENS | S₃ | -562.36 | 9.200 | 57.9/1.49334 |
| | S₄ | -339.15 | 8.1494 | 1.0 |
| THIRD LENS | S₅ | 76.594 | 22.700 | 61.25/1.59137 |
| | S₆ | -235.00 | 3.080 | 1.0 |
| FOURTH LENS | S₇ | -270.00 | 4.000 | 30.30/1.58840 |
| | S₈ | -450.00 | 9.300 | 1.0 |
| FIFTH LENS | S₉ | 18535.00 | 8.400 | 57.9/1.49334 |
| | S₁₀ | -400.00 | 29.500 | 1.0 |
| SIXTH LENS | S₁₁ | -55.499 | 3.405 | 57.9/1.49334 |
| | S₁₂ | -58.000 | 11.49 | 1.44704 |
| TRANSPARENT MEDIUM | | ∞ | 14.1 | 1.56232 |
| PANAL OF CATHODE-RAY TUBE | FACE PLANE FLUORESCENT PLANE | -350.00 | | |

FIG.17B

| LENS | FACE | CC | AE | AE | AG | AH |
|---|---|---|---|---|---|---|
| FIRST LENS | $S_1$ | -14.205306 | -4.99132×10$^{-7}$ | -7.52281×10$^{-10}$ | 3.04572×10$^{-13}$ | -3.17985×10$^{-17}$ |
| | $S_2$ | 1.500000 | -9.63142×10$^{-7}$ | 4.48452×10$^{-10}$ | -1.48606×10$^{-13}$ | 3.24547×10$^{-17}$ |
| SECOND LENS | $S_3$ | 8.000000 | 2.70666×10$^{-6}$ | 3.50490×10$^{-10}$ | -2.62215×10$^{-13}$ | 4.22459×10$^{-17}$ |
| | $S_4$ | 8.340000 | 2.08869×10$^{-6}$ | -1.90134×10$^{-10}$ | 2.77475×10$^{-14}$ | -1.42593×10$^{-17}$ |
| FOURTH LENS | $S_7$ | 0.000000 | -7.29331×10$^{-7}$ | -1.99626×10$^{-10}$ | 6.48129×10$^{-15}$ | -1.12055×10$^{-18}$ |
| | $S_8$ | 0.000000 | -1.29715×10$^{-6}$ | 1.84357×10$^{-10}$ | -1.46193×10$^{-13}$ | 2.60704×10$^{-17}$ |
| FIFTH LENS | $S_9$ | -15.300000 | -1.70710×10$^{-7}$ | 2.13023×10$^{-9}$ | -1.37605×10$^{-12}$ | 1.09708×10$^{-16}$ |
| | $S_{10}$ | 0.000000 | 1.58758×10$^{-6}$ | 2.05252×10$^{-9}$ | -9.15005×10$^{-13}$ | 5.00000×10$^{-17}$ |
| SIXTH LENS | $S_{11}$ | 0.000000 | -1.89756×10$^{-6}$ | 1.72825×10$^{-9}$ | -1.08034×10$^{-12}$ | 3.39635×10$^{-15}$ |

$$Z = \frac{r^2/RD}{1+\sqrt{1-(1+CC)r^2/RD^2}} + AE \cdot r^4 + AF \cdot r^6 + AG \cdot r^8 + AH \cdot r^{10}$$

PROJECTION IMAGE DISPLAY APPARATUS

This is a divisional application of U.S. Ser. No. 08/997,761, filed Dec. 24, 1997.

BACKGROUND OF THE INVENTION

The present invention relates to a projection image display apparatus for enlarging/projecting an image outputted from an image generating source, for example, a projection TV by a projection lens onto a screen, and a projection optical system employed in this projection image display apparatus. More specifically, the present invention is directed to such a projection image display apparatus suitable for increasing a color purity, and further for improving focus performance and contrast without deteriorating brightness of an image.

While various image sources are required, rear projection image display apparatus have be widely marketed as large screen projection optical apparatus in view of light weight, low cost, and compact needs.

Within a cabinet of this rear projection image display apparatus, there are provided three projection tubes and projection lenses corresponding to the respective projection tubes. These three projection tubes independently produces red, green, blue-colored image light, respectively, as an image generating source (will be referred to as "red, green, blue image light projection tubes" hereinafter). Then, original images displayed on fluorescent planes, or fluorescent faces of the respective red, green, blue image light projection tubes are enlarged/projected onto a screen by the projection lenses so as to be synthesized with each other, so that a full color image may be displayed.

This rear projection image display apparatus is disclosed in, for instance, JP-A-3-224384, and employs the colored lens element in order to give the wavelength selecting characteristic (filtering effect) to the projection lens used in the green image light projection tube. This display apparatus uses the colored lens element so as to reduce a spurious component close to the red and blue wavelengths involved in the light emission spectrum of the fluorescent substance of the green fluorescent plane. As a result, the color reproduction range of the enlarged image displayed on the screen is expanded, the color aberration is reduced, and the focus performance is improved. Furthermore, the concave lens element located near the fluorescent plane of the projection tube is colored, so that the unnecessary light component which is reflected on the light projection (emission) plane thereof and then is returned to the fluorescent plane can be absorbed/reduced two times. Accordingly, the contrast performance can also be improved.

In addition, very recently, as described above, in order that the projection lens employed in the red image light projection tube other than the projection lens employed in the green image light projection tube is equipped with the wavelength selecting characteristic (filtering effect), the colored lens element is employed in the rear projection image display apparatus. This colored lens element causes the spurious component close to the green wavelength involved in the light emission spectrum of the fluorescent substance of the red fluorescent plane, to be reduced, so that the color reproduction range of the enlarged image displayed on the screen can be expanded. Similar to the green image light projection tube, since the concave lens element located close to the fluorescent plane of this red image light projection tube is colored, the contrast performance can also be improved at the same time.

SUMMARY OF THE INVENTION

On the other hand, brightness of the normal display apparatus is represented by luminance of a white color projected on a screen in an enlargement manner. When a white color is displayed by an actual display apparatus, in the case that chromaticity of each of red, green, blue image light is constant, the red image light is mixed with the blue image light in a preselected luminance ratio, while using the green image light as the reference, which may highly control the brightness. To produce necessary luminance on the fluorescent plane of each of the projection tubes, each of the cathod currents must be set to a predetermined current value based upon the cathod current-to-luminance characteristics of the respective projection tubes.

In this case, as previously explained, when the colored lens elements are employed in order that the wavelength selecting characteristics (filtering effects) are given to the projection lens used in the green image light projection tube and also the projection lens used in the red image light projection tube, the resultant color purity is increased. However, since a portion of the light component which constitutes the major portions of the green image light and the red image light is also absorbed by the colored lens elements to be thereby attenuated, there is such a problem that the brightness is lowered.

Also, the transmission projection type screen is constructed by combining a plurality of transparent resin. As a result, when the ambient light such as illuminating light is entered into the screen, a portion of this entered ambient light is reflected on the surfaces of the internal transparent resin, and then is returned to the light incident side. Since this returned ambient light is superimposed with the image light which has passed through the screen, this may cause the contrast performance of the displayed image to be lowered.

Conventionally, a lenticular sheet is employed as one of the transparent resin used in this transmission projection type screen, a light absorption layer is provided between the respective longitudinal lenticular lenses provided on the light projection plane thereof, and then the ambient light is absorbed by this light absorption layer. As a consequence, the light amount of the ambient light entered into this lenticular sheet is reduced. However, since the ambient light is entered from the portion of the longitudinal lenticular lens of this lenticular sheet, the resultant contrast performance is lowered by the ambient light which is reflected inside the screen and then is returned.

The present invention has been made to solve the above-described problems, and has an object to provide a projection image display apparatus capable of suppressing lowering of brightness of a displayed image to thereby improve focus performance and contrast performance, and capable of increasing a quality of the displayed image.

Another object of the present invention is to provide a projection image display apparatus capable of suppressing a reduction in brightness of a displayed image to thereby reducing an adverse influence caused by reflections of ambient light.

To achieve the above-explained objects, a projection image display apparatus, according to an aspect of the present invention, is featured by that a light transmitting means having a preselected light transmittance characteristic is provided with a lens element of a projection lens corresponding to a green image light projection tube and also a lens element of a projection lens employed in a red image light projection tube so as to reduce unwanted spurious components in the image light generated from the green image light projection tube and the red image light projection tube, and further to increase transmittance of a major component. In particular, when this light transmitting means is provided with a concave lens element located close to a fluorescent plane of the projection tube, the unwanted light components which are reflected on the light projection plane thereof and then is returned to this fluorescent plane are absorbed and reduced two times. As a consequence, contrast performance can be improved.

Also, to achieve another object, a screen, according to another aspect of the present invention, is featured by that a light transmitting means is provided with a transmission projection type screen, and this light transmitting means attenuates energy to a value smaller than, or equal to a predetermined value in a wavelength region other than wavelengths λ Rmax, λ Bmax, λ Gmax of peak energy of a spectral distribution in each of image light produced from each of red, green, blue image light projection tubes.

BRIEF DESCRIPTION OF THE DRAWINGS

A more complete understanding of the teachings of the present invention may be acquired by referring to the accompanying drawings, in which:

FIG. 5 is a diagram for indicating spectral tristimulue values at the visual field angle of 2°;

FIG. 6 is a diagram for indicating spectral tristimulue values at the visual field angle of 10°;

FIGS. 17A and 17B are diagram for representing lens data of the projection lens indicated in FIG. 1;

DETAILED DESCRIPTION OF THE PREFERRED EMBODIMENT

Referring now to drawings, preferred embodiment modes of the present invention will be described. For the sake of easy explanations, light transmitting means having preselected light transmitting characteristics will be explained in comparison with the prior art. These light transmitting means are provided on an lens element of a projection lens corresponding to a green image light projection tube, and also a lens element of a projection lens corresponding to a red image light projection tube.

Figure 1:
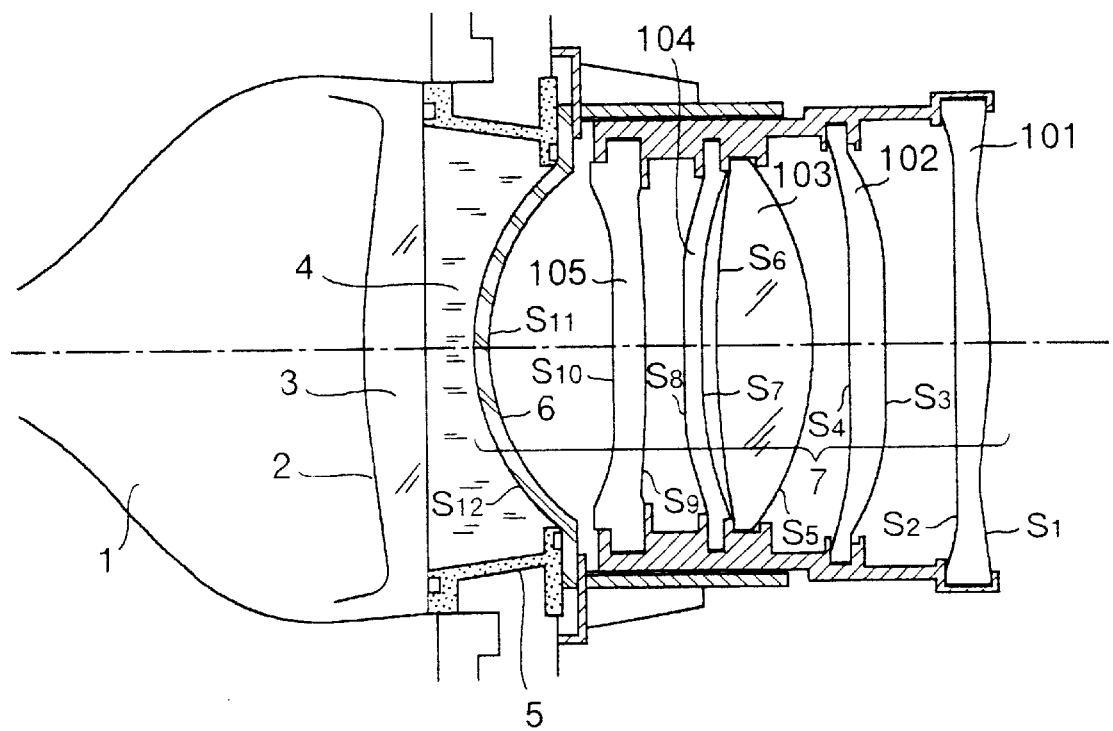
FIG. 1 schematically shows a portion of a projection optical system according to the present invention, i.e., a sectional view for representing an arrangement of a projection tube and a projection lens.

FIG. 1 is a sectional view for representing a structure of a projection tube and a structure of a projection lens, which are applied to a projection optical system according to the present invention. In this drawing, reference numeral 1 shows a projection tube, reference numeral 2 indicates a fluorescent face, reference numeral 3 denotes a face panel, reference numeral 5 represents a bracket, reference numeral 6 denotes a concave lens element, reference numeral 7 shows a projection lens, and also reference numerals 101 to 105 indicate lens elements.

In this drawing, the bracket 5 is mounted on the face panel 3 of the projection tube 1, and the concave lens element 6 is provided with this bracket 5. Then, coolant 4 is filled into a closed space formed by this face panel 3, the bracket 5, and the concave lens element 6.

On the front face side of the concave lens element 6, a plurality (in this embodiment, five) of lens elements 105, 104, 103, 102, and 101 are arrayed in the same axis in this order from the side of this concave lens element 6. The concave lens element 6 and these lens elements 101 to 105 constitute the projection lens 7 of the projection tube 1. In accordance with the present invention, a preselected light transmitting characteristic (filter characteristic) is given to any one of these lens elements (namely, concave lens element 6 hereinafter) for constituting this projection lens 7, so that a predetermined effect (will be explained) may be achieved. This light transmitting characteristic will be explained later.

Figure 2:
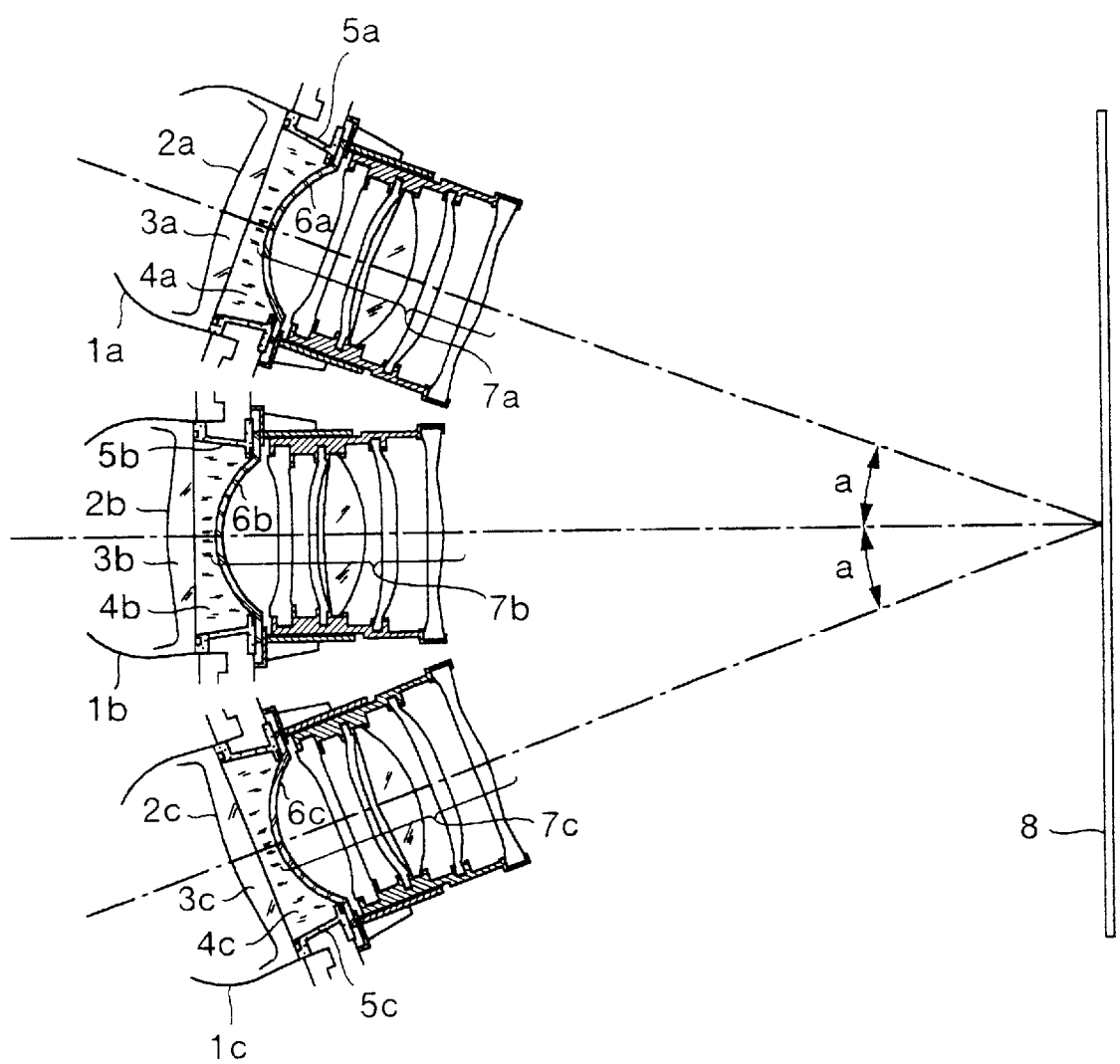
FIG. 2 is a sectional view for schematically showing an arrangement of a projection optical system according to a first embodiment of the present invention.

FIG. 2 is such a sectional view that a projection optical system with employment of the projection tube and the projection lens shown in FIG. 1, according to an embodiment mode of the present invention, is expanded on the horizontal plane. In this drawing, reference numerals 1a, 1b, 1c show red, green, blue image light projection tubes respectively; reference numerals 2a, 2b, 2c represent fluorescent faces (red, green, blue colors of fluorescent faces) of the projection tubes 1a, 1b, 1c, respectively; reference numerals 3a, 3b, 3c denote face panels of the projection tubes 1a, 1b, 1c respectively. Also, reference numerals 4a, 4b, 4c are coolant of the respective projection tubes 1a, 1b, 1c; reference numerals 5a, 5b, 5c represent brackets of the respective projection tubes 1a, 1b, 1c; reference numerals 6a, 6b, 6c show concave lens elements of the respective projection tubes 1a, 1b, 1c; reference numerals 7a, 7b, 7c indicate projection lenses of the respective projection tubes 1a, 1b, 1c; and reference numeral 8 indicates a screen.

In this drawing, both the red image light projection tube 1a and the projection lens 7a constitute a projection optical system for the red image light. The red image light projection tube 1a displays the red image on the fluorescent face 2a thereof, and this red image is enlarged by the projection lens 7a to be projected onto the transmission type screen 8. Also, both the green image light projection tube 1b and the projection lens 7b constitute a projection optical system for the green image light. The green image light projection tube 1b displays the green image on the fluorescent face 2b thereof, and this green image is enlarged by the projection lens 7b to be projected onto the screen 8. Furthermore, both the blue image light projection tube 1c and the projection lens 7c constitute a projection optical system for the blue image light. The blue image light projection tube 1c displays the blue image on the fluorescent face 2c thereof, and this blue image is enlarged by the projection lens 7c to be projected onto the screen 8. These red, green, blue-colored images which are enlarged and projected are synthesized with each other, so that a full color image is projected on the screen 8. Each of the structures of the respective projection optical systems for the red image, the green image, and the blue image.

Among the red, green, blue image light projection optical systems, an optical axis of the green image light projection optical system having the highest spectral luminous efficiency is set perpendicular to the screen 8, whereas an optical axis of the red image light projection optical system and an optical axis of the blue image light projection optical system are inclined with each other at a predetermined angle α along the opposite direction with respect to the screen 8.

Figure 3:
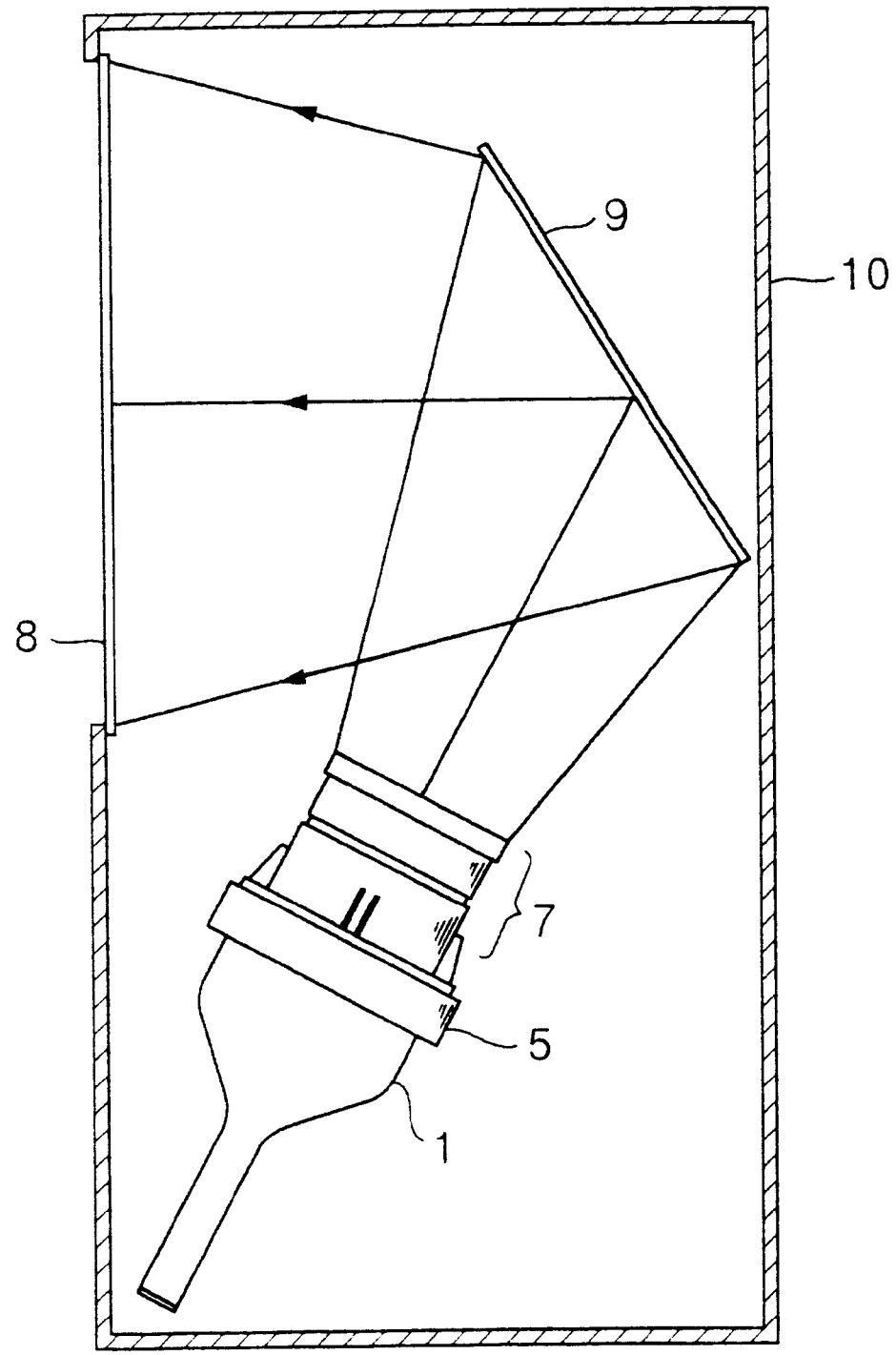
FIG. 3 is a sectional view for representing an overview of a projection image display apparatus to which the present invention is applied.

FIG. 3 is a vertical sectional view for showing such a condition that the entire projection optical system indicated in FIG. 2 is stored in a cabinet of a projection television (will be referred to as a PTV hereinafter) corresponding to one embodiment mode of the projection image display apparatus. In this drawing, reference numeral 9 shows a mirror, reference numeral 10 represents a cabinet, and the same reference numerals will be employed as these for denoting the same, or similar elements indicated in FIG. 1 and FIG. 2.

It should also be noted that for the sake of easy explanation, the portion constructed of the projection tube and the projection lens is simply called as a projection optical system, and the projection optical system defined by the present invention involves these optical elements, the mirror 9, and the screen 8, which will be referred to as an entire projection optical system.

In this drawing, the light path folding mirror 9 is arranged between the screen 8 and the projection lens 7, so that the optical path passing from the projection tube 1 to the projection lens 7 is folded by the mirror 9 to be reached to the screen 8. As a consequence, the overall projection optical system is stored into the cabinet 10, so that the PTV can be made compact.

Before describing a concrete example of this embodiment mode, "luminous efficacy" will now be explained as a supplementary explanation.

Figure 4:
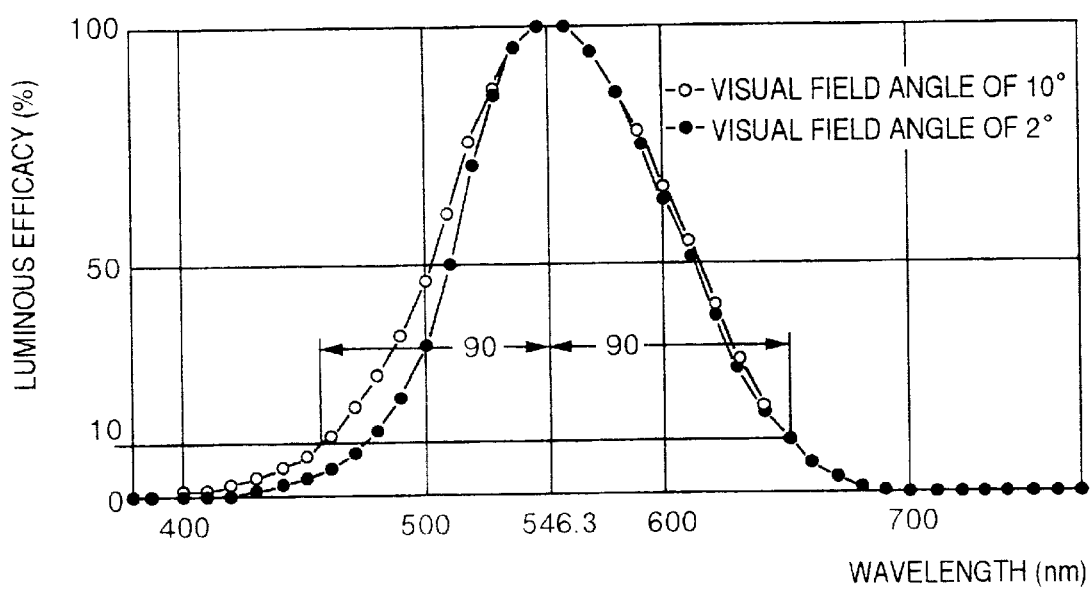
FIG. 4 is a graphic representation for indicating a spectral luminous efficiency characteristic at a visual field angle of 2 (degrees) and a visual field angle of 10°.

FIG. 4 graphically represents values of spectral tristimulus values $y\lambda$ in the XYZ calorimetric system of C.I.E. 1931 in the case of a visual field angle being 2° (degrees), and values of spectral tristimulus values $(y_{10})\lambda$ in the $X_{10} Y_{10} Z_{10}$ supplementary calorimetric system of C.I.E. 1964 in the case of another visual field angle being 10 degrees as the XYZ color specification system applied to the color specification when the observation visual field exceeds 4 degrees. This is a summary of FIGS. 5, 2 on page 398, "Optical Technique Handbook" published by ASAKURA bookstore. An abscissa of this graphic representation indicates a wavelength (nm), and an ordinate thereof indicates a spectral luminous efficiency of an optic nerve fiber existing in the values (retina of a human) of the spectral tristimulue values $y\lambda$ and $(y_{10})\lambda$.

For example, in such a case that a projection television set having an aspect ratio of 3:4 and a diagonal dimension of 50 inches (1270 mm) is observed at a distance of distinct vision of 2 m, a range having a diameter of 70 mm on the screen is observed at the visual field angle of 2 degrees. Also, another range having a diameter of 350 mm on the screen is observed at the visual field angle of 10 degrees.

As apparent from FIG. 4, in the wavelength region smaller than, or equal to 530 nm, this graphic representation indicates that the spectral luminous representation indicates that the spectral luminous efficiency for the visual sensitivity of the visual field angle of 10 degrees where the wider range is observed is greater than the spectral luminous efficiency for the visual sensitivity of the visual field angle of 2 degrees. Also, this graphic representation indicates that on the basis of the light having the wavelength of 546.3 nm whose spectral luminous efficiency is the highest efficiency, the spectral luminous efficiency for the long wavelength (red)sided region up to 640 nm (approximately, range of 90 nm) is greater than the spectral luminous efficiency for the short wavelength (blue)-sided region up to 460 nm (approximately, range of 90 nm).

As to the above-described spectral luminous efficiencies, values of spectral tristimulue values $x_\lambda$, $y_\lambda$, $z_\lambda$ in the xyz color specification system of C.I.E. 1931 when the observation visual field angle is 2 degrees are indicated in FIG. 5. Similarly, values of spectral tristimulue values $(y_{20})\lambda$ in the $X_{10} Y_{10} Z_{10}$ supplementary calorimetric system of C.I.E. 1964 when the observation visual field angle is 10 degrees are indicated in FIG. 6.

Figure 7:
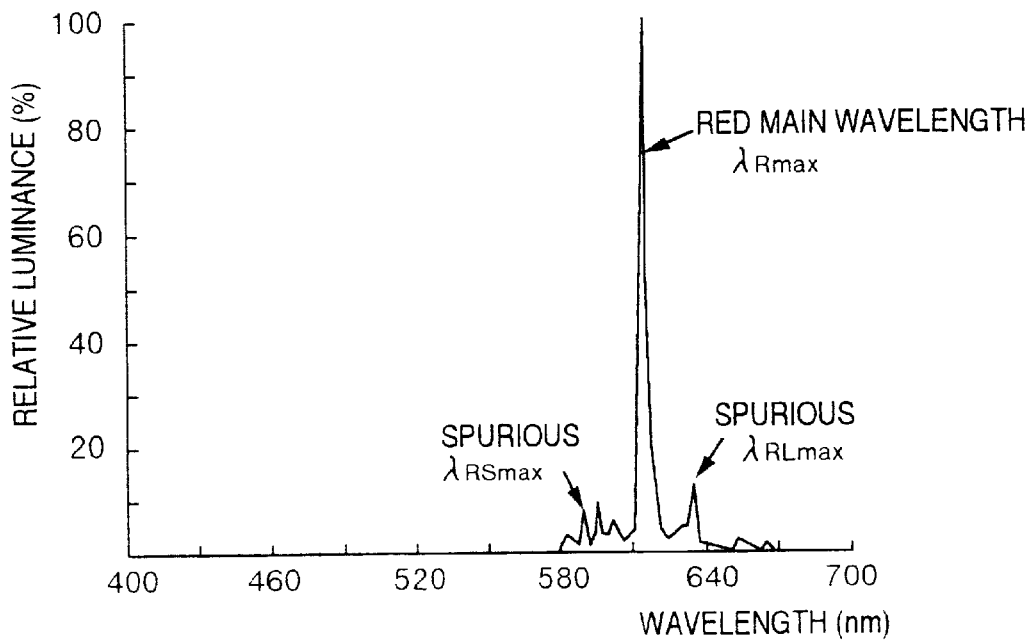
FIG. 7 is a graphic representation for showing an emission spectrum distribution of a red fluorescent substance used in a red image light projection tube.

Next, a description will now be made of an emission spectrum distributions about the presently available red, green, blue fluorescent substances. FIG. 7 graphically shows an emission spectrum distribution about a fluorescent substance used in the red image light projection tube. An abscissa of FIG. 7 indicates relative luminance (%), and an ordinate thereof indicates a wavelength λ(nm).

In this drawing, the emission spectrum contains a spurious component (wavelength of sub-peak λ RSmax=585 nm) existing in the vicinity of 580 to 600 nm equal to the short wavelength (green)-sided wavelength region, and also a spurious component (wavelength of sub-peak λ RLmax= 635 nm) in the vicinity of 630 nm equal to the long wavelength (pure red)-sided wavelength region with respect to a component of a main wavelength λ Rmax representing peak energy in the vicinity of 612 nm.

Figure 8:
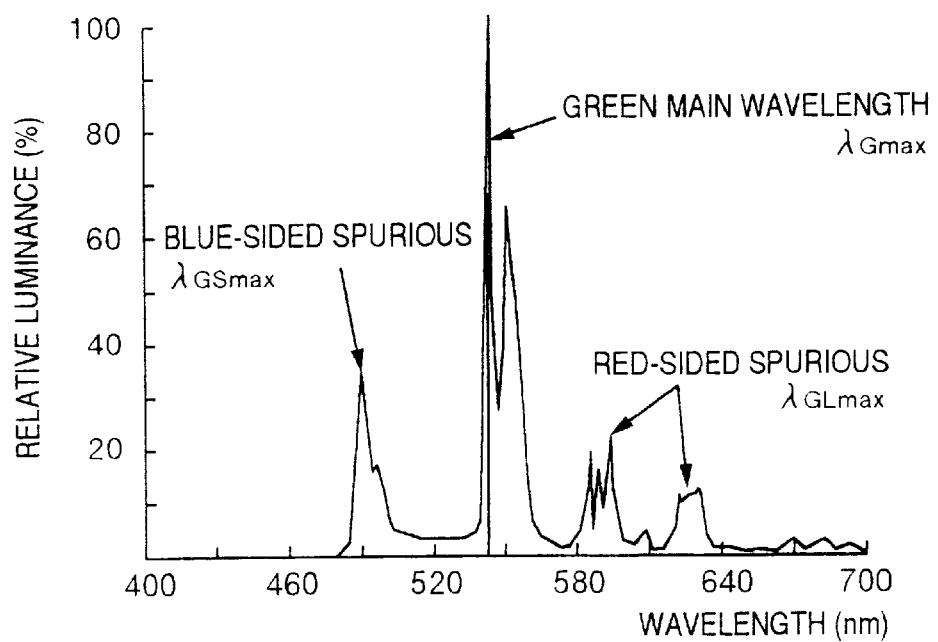
FIG. 8 is a graphic representation for showing an emission spectrum distribution of a green fluorescent substance used in a green image light projection tube.

FIG. 8 graphically shows an emission spectrum distribution about a fluorescent substance used in the green image light projection tube. An abscissa of FIG. 8 indicates relative luminance (%), and an ordinate thereof indicates a wavelength λ(nm).

In this drawing, the emission spectrum contains a spurious component (wavelength of sub-peak λ GSmax=495 nm) existing in the short wavelength (blue)-sided wavelength region, and also a spurious component (wavelengths of sub-peaks being 590 nm and λ GLmax=630 nm) in the long wavelength (red)-sided wavelength region with respect to a component of a main wavelength λ Gmax representing peak energy in the vicinity of 545 nm.

Figure 9:
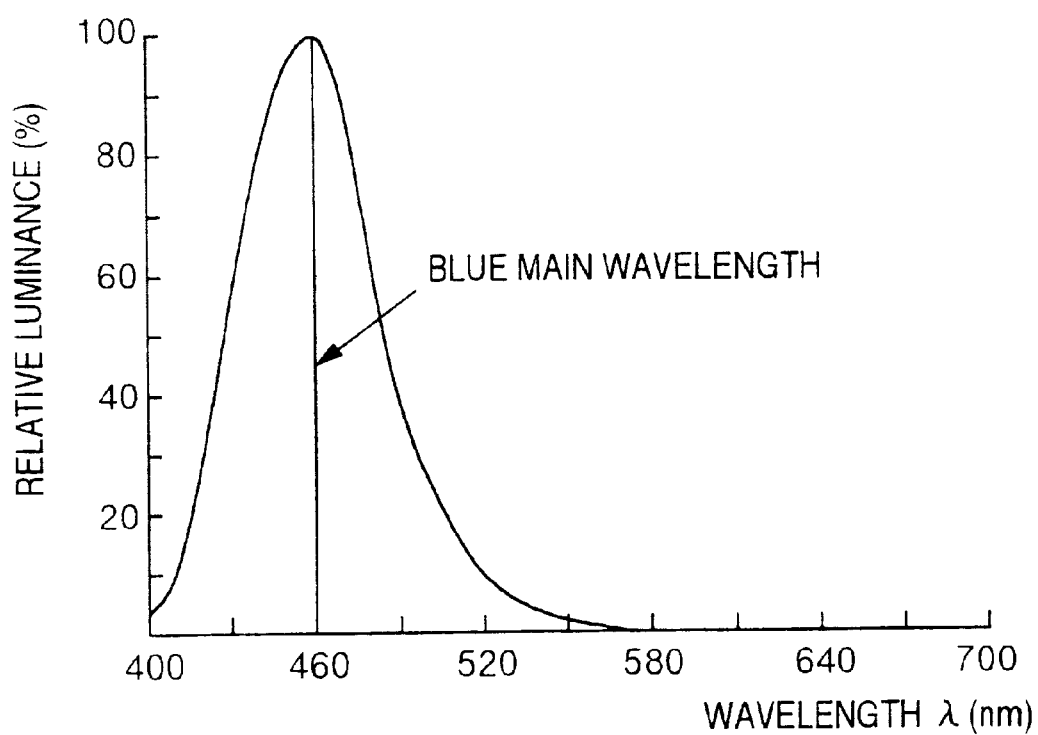
FIG. 9 is a graphic representation for showing an emission spectrum distribution of a blue fluorescent substance used in a blue image light projection tube.

FIG. 9 graphically shows an emission spectrum distribution about a fluorescent substance used in the blue image light projection tube. An abscissa of FIG. 9 indicates relative luminance (%), and an ordinate thereof indicates a wavelength λ(nm).

In this drawing, an emission spectrum distribution becomes such a characteristic for representing a mountain-shaped broad curve with a peak at a main wavelength of 460 nm. When paying an attention to a wavelength range of ±30 nm with respect to light having a main wavelength of 460 nm with the highest relative luminance, the relative luminance in the short wavelength-sided region represents the higher visual sensitivity than that in the short wavelength-sided region. Also, in the wavelength region exceeding 490 nm, the relative luminance is gradually decreased, and the visual sensitivity becomes substantially 0% at the wavelength of 565 nm.

Next, a description will now be made of a transmittance characteristic of a light transmitting means according to this embodiment mode, and also the transmittance characteristic of the conventional light transmitting means, which is provided with the concave lens element (see FIG. 1) of the projection lens employed in each of the red, green, blue image light projection tubes.

Figure 10:
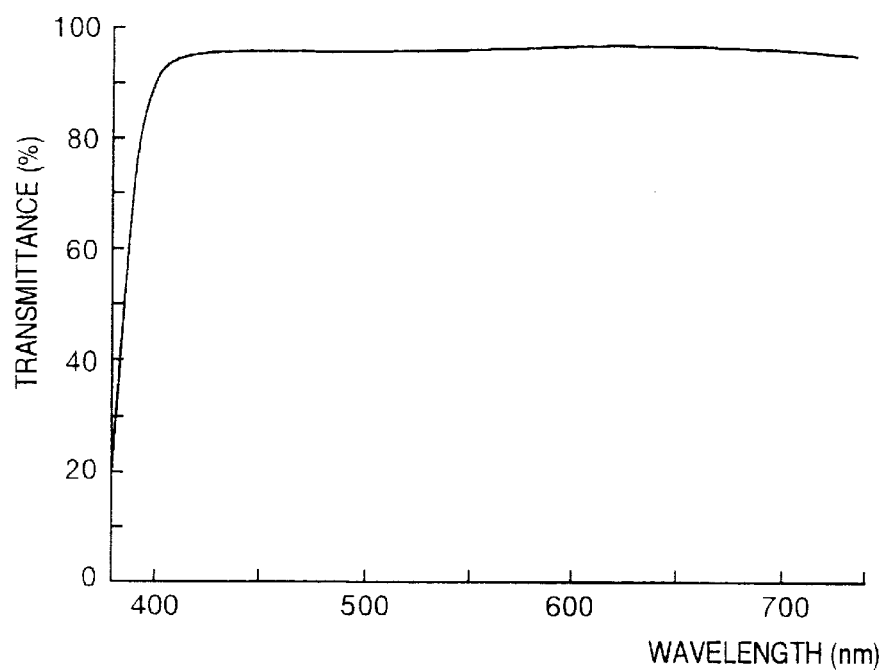
FIG. 10 is a graphic representation for indicating the transmittance characteristic of the conventional light transmitting means employed in the projection lens of the blue image light projection tube.

FIG. 10 graphically represents the transmittance characteristic of the conventional light transmitting means provided on the concave lens element 6c (see FIG. 2) of the projection lens 7c corresponding to the blue image light projection tube 1c, and an abscissa thereof indicates a wavelength (nm) whereas an ordinate thereof indicates transmittance (%). Also, FIG. 11 graphically represents a transmittance characteristic of the light transmitting means according to this embodiment mode, provided on the concave lens element 6c similar thereto.

Figure 12:
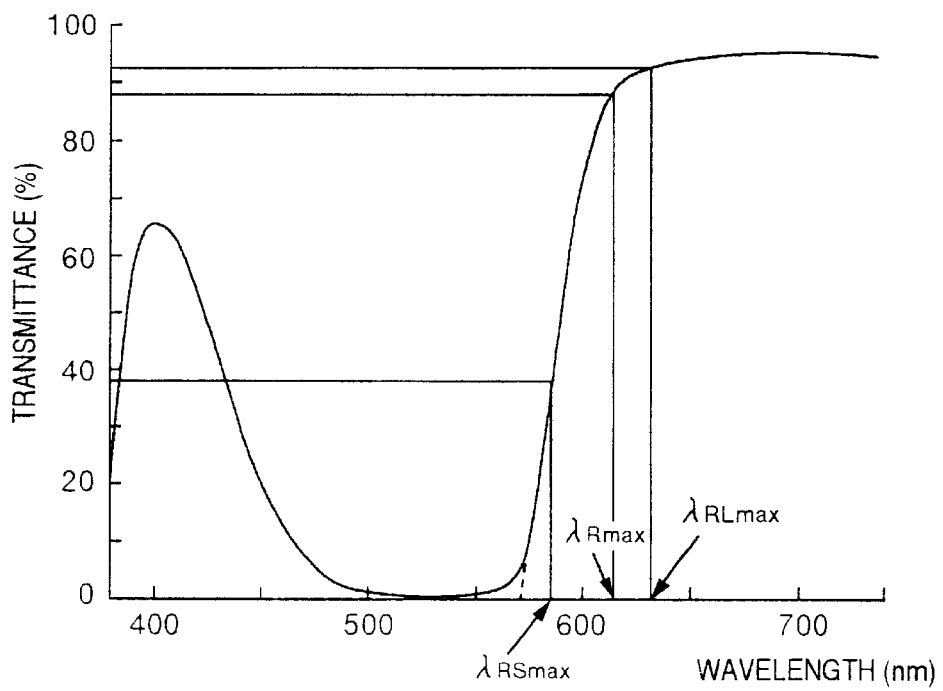
FIG. 12 is a graphic representation for indicating the transmittance characteristic of the conventional light transmitting means employed in the projection lens of the red image light projection tube.

FIG. 12 graphically represents the transmittance characteristic of the conventional light transmitting means provided on the concave lens element 6a (see FIG. 2) of the projection lens 7a corresponding to the red image light projection tube 1a. Also, FIG. 13 graphically represents a transmittance characteristic of the light transmitting means according to this embodiment mode, provided on the concave lens element 6a similar thereto.

Figure 14:
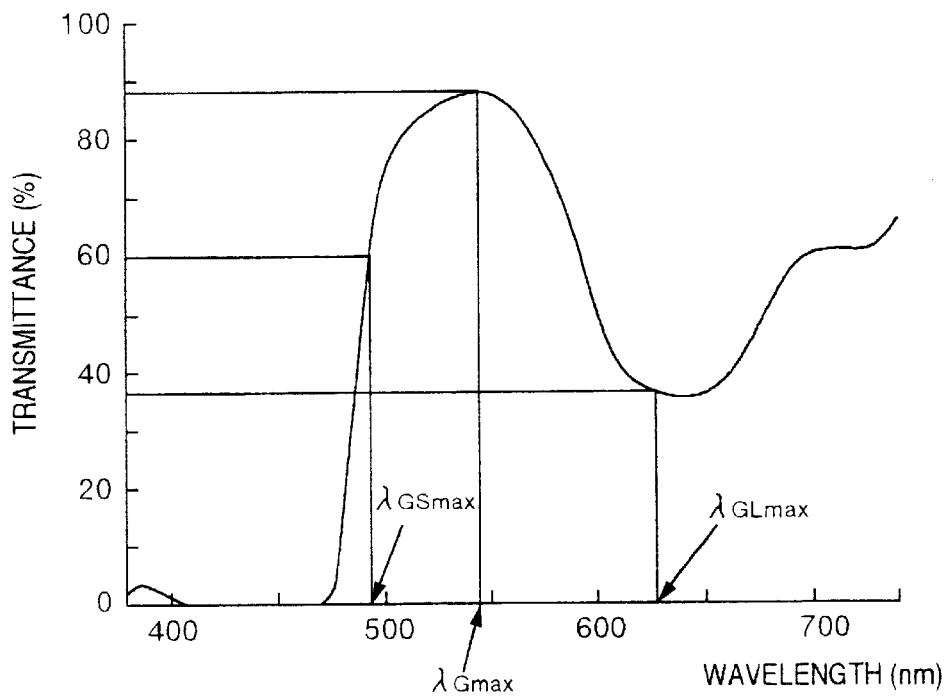
FIG. 14 is a graphic representation for indicating the transmittance characteristic of the conventional light transmitting means employed in the projection lens of the green image light projection tube.

Furthermore, FIG. 14 graphically represents the transmittance characteristic of the conventional light transmitting means provided on the concave lens element 6b (see FIG. 2) of the projection lens 7b corresponding to the blue image light projection tube 1b. Also, FIG. 15 graphically represents a transmittance characteristic of the light transmitting means according to this embodiment mode, provided on the concave lens element 6b similar thereto.

Brightness equal to one of the major performance items of the PTV is typically indicated by display luminance when a white color is displayed on the screen. In order that the above-described red, green, blue (three colors) image light is mixed with each other to thereby obtain a predetermined white color and furthermore the display luminance is improved, there are two methods, i.e., a method for changing the chromaticity of the respective R.G.B colors to vary the cathode current distributing ratio, and another method for increasing the cathode currents flowing through the respective projection tubes to thereby increase the luminance.

When each of the color image light having the characteristics shown in FIG. 7, FIG. 8, and FIG. 9 was actually measured by the luminance calorimeter (namely, BM-5 manufactured by Topcon), as to the chromaticity (x,y) on the chromaticity diagram of C.I.E. 1931, the blue image light was (0.126, 0.045); the red image light was (0.652, 0.342); and the green image light was (0.322, 0.578). The luminance ratio of the three colors, i.e., red, green, and blue is 0.176; 1.0: 0.146 required to enlarge/project these image light on the screen 8 (see FIG. 2) to thereby display a white color (it is assumed that color temperature is 9300K+0 MPCD, and chromaticity point is (0.285, 0.294)).

Figure 16:
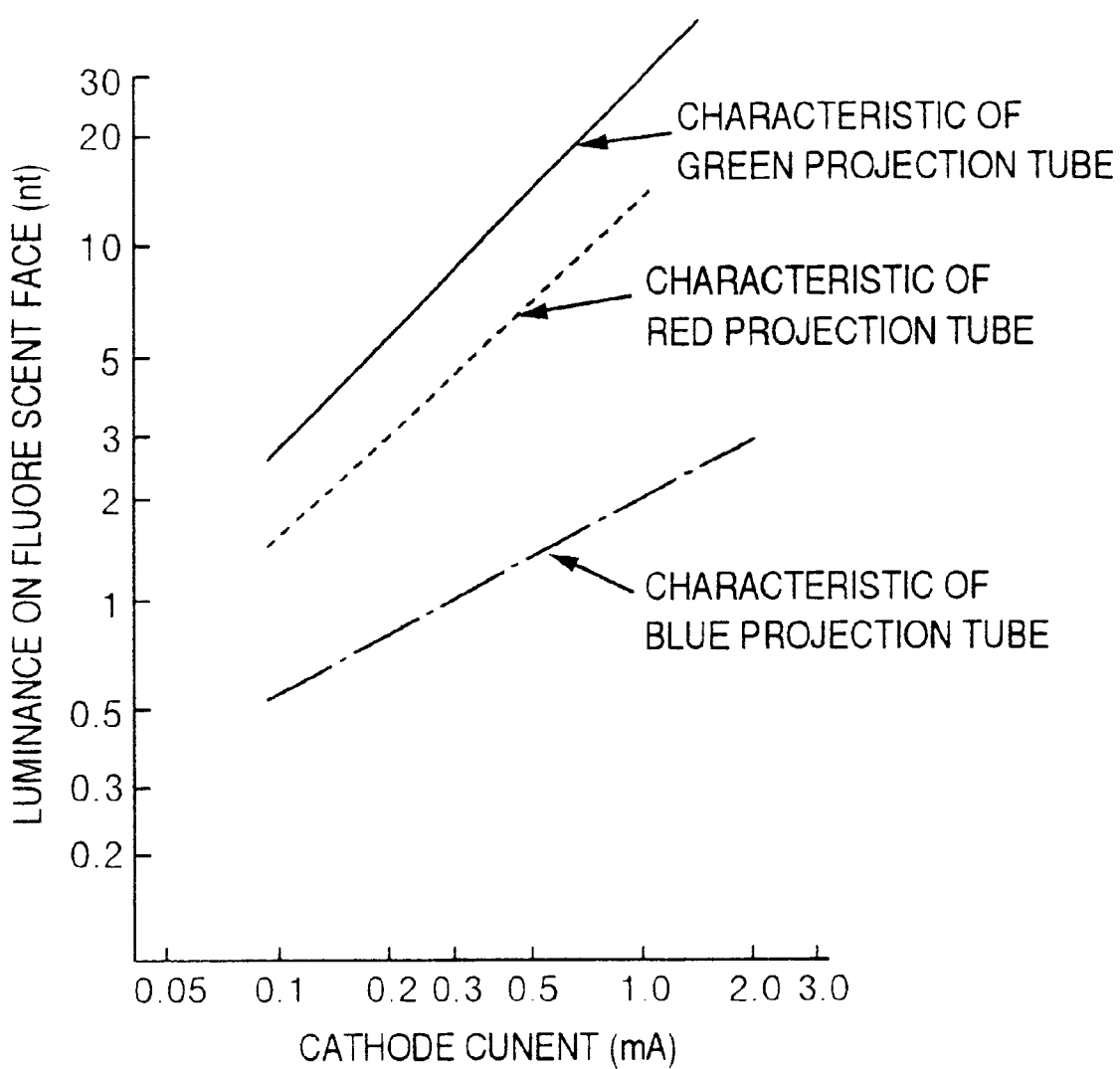
FIG. 16 is a characteristic diagram for representing a relationship between cathode currents and luminance on fluorescent faces of the red, green, blue image light projection tubes.

FIG. 16 is a characteristic diagram for showing a relationship between a cathode current and luminance on fluorescent face in each of the presently available red, green, blue image light projection tubes 1a, 1b, 1c (see FIG. 2).

In this drawing, as to luminance when the same currents are supplied to the cathodes of the projection tubes 1a, 1b, 1c, assuming now that the luminance of the green image light is the basic luminance, the luminance of the red image light is approximately 60%, whereas the luminance of the blue image light is 5% to 20%, namely (occurred when very fine numerals are displayed on a portion of black screen), luminance of blue image light is shortened.

As a consequence, although there is a sufficient margin as to the necessary relative luminance 0.176 of the blue image light while the green image light is employed as the reference in order to display the white color, its realization is difficult. When the cathode current is higher than, or equal to 0.2 mA as to the necessary relative luminance 0.164 of the blue image light while the green image light is employed as the reference. Accordingly, in the prior art, the electron beam entered into the fluorescent substance of the fluorescent face of the blue image light projection tube is widened so as to perform the solution capable of compensating for the shortage luminance while sacrificing the focus performance.

To the contrary, in accordance with this embodiment, in order to compensate for a shortage of the brightness of the blue image light having the emission spectrum distribution indicated in FIG. 9, the transmittance on the short wavelength side of the blue image light is increased so as to increase the color purity in addition to the above-explained conventional method, so that the luminance distribution ratio can be suppressed. As a consequence, the defocus amount can be reduced.

Figure 11:
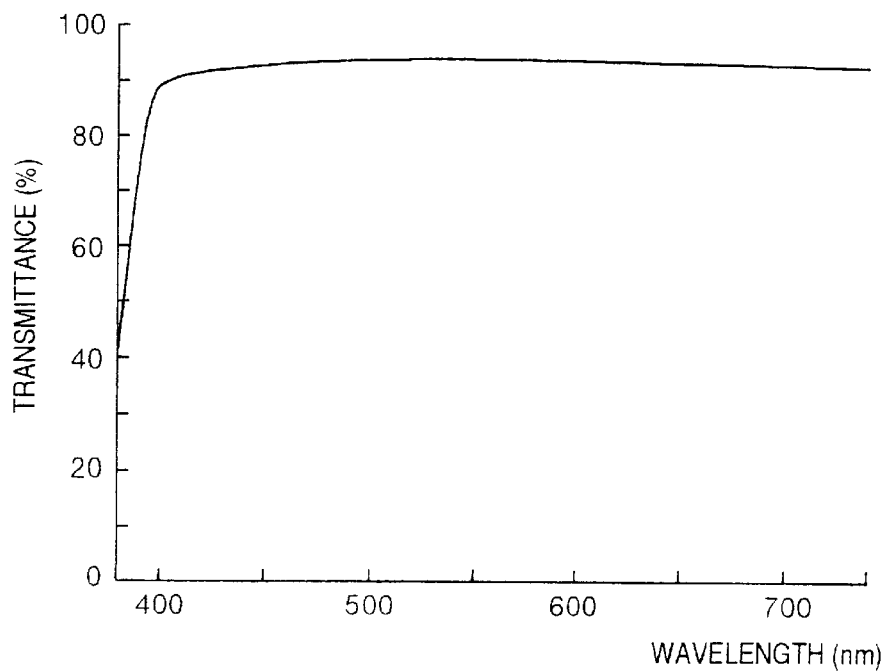
FIG. 11 is a graphic representation for representing a transmittance characteristic of a light transmitting means according to a first embodiment mode of the present invention, employed in the projection lens of the blue image light projection to be.

Concretely speaking, as shown in FIG. 11, the lens element of the projection lens 7c is manufactured by using such a material whose transmittance with respect to the light having the wavelength of 380 nm is larger than, or equal to 35% (preferably, approximately 40%). As the lens materials capable of realizing this condition, there is the PMMA (acryle) resin made by KURARAY company (tradename: PARAPET 1000L (Clar)).

To the contrary, as the lens material of the projection lens for the conventionally employed blue image light projection tube, there is the PMMA (acryle) resin made by ASAHI CHEMICAL company (tradename: DELPET 80NR (clear). This transmittance characteristic is given, as shown in FIG. 10, by that the transmittance with respect to the light having the wavelength of 380 nm is on the order of 25%.

Next, as the lens material of the concave lense element 6a of the projection lens 7a corresponding to the red light image projection tube 1a, there is the colored PMMA (acryle) rein pellet (tradename: DELPET 80NR (color number: LM90410) manufactured by ASAHI CHEMICAL company, and this resin pellet owns, for instance, a transmittance characteristic shown in FIG. 12. Since the lens element is formed by using this pellet, a desirable characteristic could be obtained.

In order that the color purity of the red image light shown in FIG. 7 is increased by this lens element, it is so set that the transmittance TRS with respect to the light having the wavelength $\lambda$ Rsmax (=585 nm) of the sub-peak energy, corresponding to a spurious component existing on the short wavelength side is lowered with respect to the main wavelength $\lambda$ Rmax (=615 nm) of the peak energy. However, in this case, the transmittance of the wavelength $\lambda$ Rmax (=615 nm) of the peak energy corresponding to the main component is lowered at the same time. As a consequence, although the chromaticity of the red image light can be slightly improved, the brightness is conversely lowered. Thus, it can be recognized that the luminance of the white color produced when the red, green, and blue colors are mixed with each other is also lowered.

As a consequence, the Inventors of this invention could investigate by the experiment such a fact that the color purity could be furthermore improved while substantially not lowering the luminance of the white color obtained when the three colors, i.e., red, green, blue were mixed with each other if could satisfy the following conditions. That is, based on the lens material employed in the prior art, the ratio of the transmittance TRS at the wavelength $\lambda$ RSmax (=585 nm) of the sub-peak energy equal to the spurious component existing on the short wavelength side to the transmittance TRL at the wavelength $\lambda$ RLmax of the sub-peak energy in the region on the long wavelength side is smaller than, or equal to a certain % with respect to the wavelength $\lambda$ Rmax (=615 nm) of the peak energy of the red image light. Also, which conditions could be satisfied.

As a result, it could be recognized in that the color purity could be furthermore improved even in visual observation by using such a lens element as the projection lens 7a, and also while substantially not lowering the luminance of the white color produced when the three colors, i.e., red, green, blue are mixed with each other based on a light transmitting means (will be explained later) provided on the lens element of the projection lens 7b mounted in the green image light projection tube 1b. The above-described lens element was formed by such a lens material whose transmittance is smaller than, or equal to 10% with respect to the transmittance of the lens material in which lowering of the transmittance with respect to the wavelength $\lambda$ Rmax (=615 nm) of the peak energy of the red image light becomes the reference, and also by such a lens material having a transmittance characteristic capable of satisfying the following condition:

$$TRS \leq TRL/3.$$

As a lens material capable of realizing the above-described light transmitting means provided with the lens element of the projection lens 7a corresponding to the red image light projection tube 1a, there is, for instance, a colored PMMA (acryle) resin pellet (tradename: PARAPET HR-11160L) manufactured by KURARE company, and having a transmittance characteristic shown in FIG. 13. Since the lens element was formed by employing this pellet, a desirable characteristic could be obtained. In particular, since this lens material is used to form the concave lens element 6a, it could manufacture such a projection lens 7a with superior contrast performance.

On the other hand, as a lens material for realizing the conventional light transmitting means provided on the lens element of the projection lens 7b (see FIG. 2) employed in the green image light projection tube 1b, there is, for instance, a colored PMMA (acryle) resin pellet (tradename: DELPET 80R (color No. LM90701)) manufactured by ASAHI CHEMICAL company, and having a transmittance characteristic shown in FIG. 14. Since the concave lens element 6b was formed by employing this pellet, a desirable characteristic could be obtained.

To increase the color purity of this green image light, in FIG. 8, among the spurious components existing in the length wavelength side with respect to the wavelength $\lambda$ Gmax (=545 nm) of the peak energy, in particular, it is required to lower the transmittance TGL with respect to the light having the wavelength $\lambda$ GLmax (=630 nm) of the sub-peak which exists on the side of further long wavelengths than the wavelength $\lambda$ Rmax of the peak energy of the red fluorescent substance. However, in the conventional light transmitting means, if this transmittance TGL is lowered in the above-described manner, then the transmittance of the light having the wavelength $\lambda$ Gmax (=545 nm) of the peak energy is lowered at the same time. As a result, although the color purity of the green image light can be slightly improved, to the contrary, it could be recognized that the brightness is lowered, and also the luminance of the white color obtained by mixing the three colors, i.e., red, green, blue is lowered.

As a consequence, the Inventors of this invention could investigate by the experiment such a fact that the color purity could be furthermore improved while substantially not lowering the luminance of the white color obtained when the three colors, i.e., red, green, blue were mixed with each other if could satisfy the following conditions. That is, based on the lens material employed in the prior art, the ratio of the transmittance TGS at the wavelength $\lambda$ GSmax of the sub-peak energy in the short-wavelength-sided region rather than the wavelength $\lambda$ Gmax (=545 nm) of the peak energy of the green image light, to the light transmittance TGL at the wavelength $\lambda$ GLmax of the sub-peak energy existing in the long-wavelength-sided region rather than the main wavelength $\lambda$ Rmax of the peak energy of the spectrum of the red image light, and being the spurious component existing in the long-wavelength-sided region rather than the wavelength $\lambda$ Gmax of the peak energy of the green image light is smaller than, or equal to a certain %. Also, which conditions could be satisfied.

As a result, it could be recognized in that the color purity could be furthermore improved even in visual observation by providing such a light transmitting means in the lens element of the projection lens 7b, and also while substantially not lowering the luminance of the white color produced when the three colors, i.e., red, green, blue are mixed with each other in connection with light transmitting means provided on the lens element of the projection lens 7a mounted in the above-explained red image light projection tube 1a. The above-described light transmitting means was formed by such a lens material whose reduction of transmittance with respect to the wavelength λ Gmax (=645 nm) of the peak energy of the green image light is smaller than, or equal to 10% with respect to the transmittance of the lens material, and also by such a lens material having a transmittance characteristic capable of satisfying the following condition:

TGL≦TGS/2.

Also, as a result of the investigation executed by the Inventors, it could be recognized that as the green image light, the observers could have better feelings to the blue green existing slightly in the short wavelength range rather than selecting of only the wavelength approximated to an e line (wavelength=545 nm) which is equal to an originally dark green color within the emission spectrum indicated in FIG. 8.

As a consequence, in accordance with this embodiment mode, the peak of the transmittance of the light transmitting means provided in the lens element of the projection lens 7 corresponding to the green image light projection tube 1b is set on the short wavelength side rather than the wavelength λ Gmax (=545 nm) of the peak energy of the green image light.

As previously described, as a lens material capable of realizing the above-described light transmitting means provided with the lens element of the projection lens 7b corresponding to the green image light projection tube 1b, there is, for instance, a colored PMMA (acryle) resin pellet (tradename: PARAPET HR-14132L) manufactured by KURARE company, and having a transmittance characteristic shown in FIG. 15. Since the lens element was formed by employing this pellet, a desirable characteristic could be obtained. In particular, since this lens material is used to form the concave lens element 6b, it could manufacture such a projection lens 7b with superior contrast performance.

The concave lens element 6 indicated in FIG. 1 is actually manufactured by employing each of the above-described pellets. Then, various comparisons are made as to the focus performance, the color reproduction ranges, and the luminance of the white colors. The comparison results will now be explained.

First, on the basis of the focus performance of the six-group projection lens device 7 indicated in FIG. 1, the effect of this embodiment mode will now be explained. FIG. 17 represents one concrete example of lens data available by this projection lens 7, and subdivides these lens data into a spherical system (see FIG. 17a) and an aspherical system (see FIG. 17b). In the spherical system, a lens region in the vicinity of an optical axis is mainly handled. In the aspherical system, a lens region for an outer peripheral portion of this spherical system is handled. It should be understood that a first lens, a second lens, a third lens, a fourth lens, and a fifth lens in this drawing correspond to the lens element 101, the lens element 102, the lens element 103, the lens element 104, and the lens element 105, respectively. A sixth lens corresponds to the concave lens element 6. Also, the lens faces of these lens elements correspond to those of FIG. 1.

First, FIG. 17 represents that a radius of curvature of the screen 8 is infinite (namely, flat), an interval along the optical axis from this screen 8 to the first lens 101 is 1042.6 m, and an index of a medium filled between them is 1.0. Also, FIG. 17 shows that a radius of curvature of a lens plane S1 of the first lens 101 is 112.98 mm (curvature center being on the side of fluorescent plane), an interval along the optical axis of the lens planes S1 and S2 of the first lens 101 is 8.87 mm, and an index of a medium filled between them is 1.49334. Similarly, FIG. 17 subsequently shows various lens data, and finally shows data about the fluorescent plane 2 of the face panel 3 of the projection tube (cathode-ray tube) 1.

As to the lens planes S1, S2 of the first lens 101, the lens planes S3, S4 of the second lens 102, the lens planes S7, S8 of the fourth lens 104, the lens planes S9, S10 of the fifth lens 105, and the lens plane S11 of the sixth lens 6, aspherical coefficients are indicated in FIG. 17(b).

It should be noted that aspherical coefficients are equal to the respective coefficients when the lens plane shape is expressed by a formula indicates a height (function of "r") of the lense plane when the optical axis direction of the lens is selected to be the Z axis, symbol "r" indicates a distance from the optical axis of the lens along the radial direction, and symbol "RD" shows a radius of curvature. Now, when coefficients CC, AE, AF, AG, AH of this formula are given, the height of the lens, namely the shape of this lens may be determined.

Figure 18:
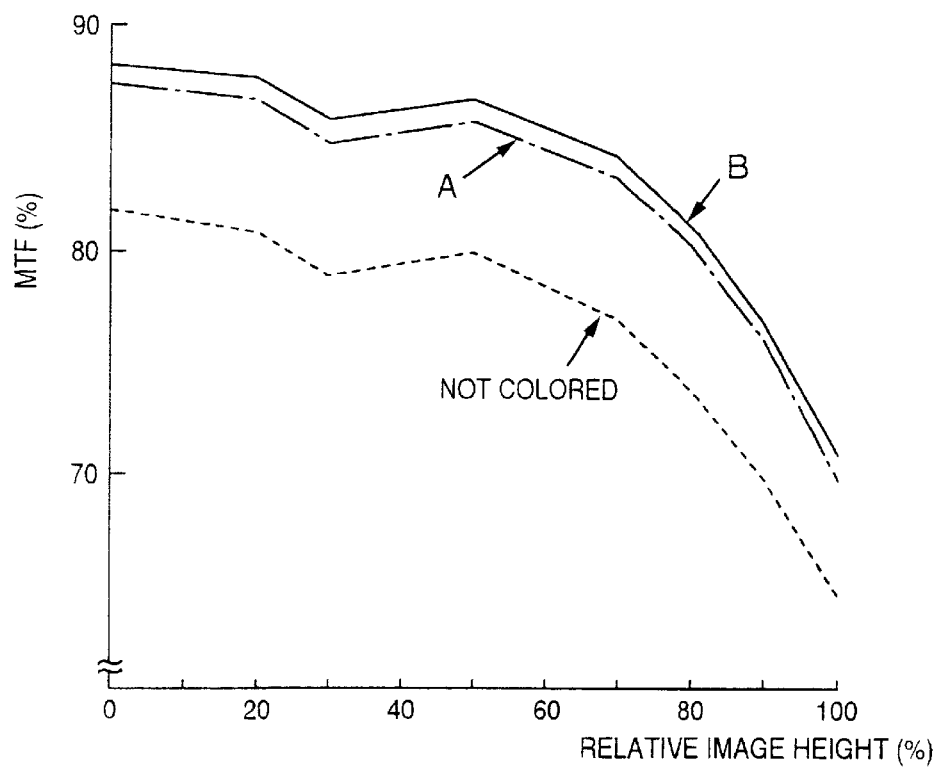
FIG. 18 is a diagram for showing focus performance of the projection lens according to the first embodiment mode of the present invention.

FIG. 18 is a graphic representation for showing focus performance of the six-group projection lens device 7, as previously explained with reference to FIG. 1, with respect to the green image light (spectrum distribution thereof is shown in FIG. 8). An abscissa of this graphic representation shows a relative image height under such a condition that a corner of the display plane of the screen is selected to be 100%, and an ordinate thereof indicates a MTF (Modulation Transfer Function) of 300TV lines (average values of sagital and meridional MTFs) as a value indicative of the focus function. It should be noted that the larger this MTF value becomes, the higher the focus function becomes.

Figure 15:
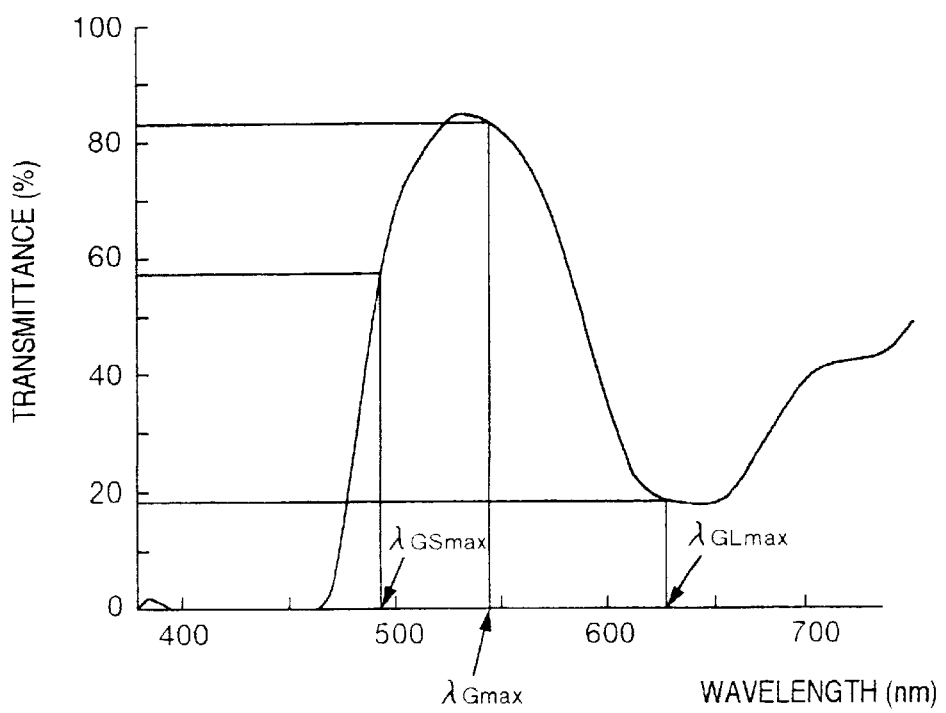
FIG. 15 is a graphic representation for representing a transmittance characteristic of a light transmitting means according to a first embodiment mode of the present invention, employed in the projection lens of the green image light projection tube.

In this drawing, a broken line indicates focus performance of the projection lens with respect to the green image light having the spectral distribution shown in FIG. 8. Also, a dot and dash line A shows focus performance in such a case that as the conventional light transmitting means, the transmittance characteristic indicated in FIG. 14 is given to the concave lens element 6 shown in FIG. 1. Furthermore, a solid line shows focus performance in such a case that as the light transmitting means according to this embodiment mode, the transmittance characteristic shown in FIG. 15 is given to the concave lens element 6 shown in FIG. 1.

When the light transmitting means according to this embodiment is employed, the MTF value is increased by approximately 1% (absolute value) in view of the average value of the overall display screen, as compared with the conventional light transmitting means. The reason is given as follows. That is, the transmittance of this light transmitting means with respect to the wavelength λ GLmax (=630 nm) of the sub-peak energy existing in the long-wavelength-sided region of the green image light shown in FIG. 8 is reduced by a half value thereof, as compared with the transmittance of the conventional light transmitting means.

Figure 19:
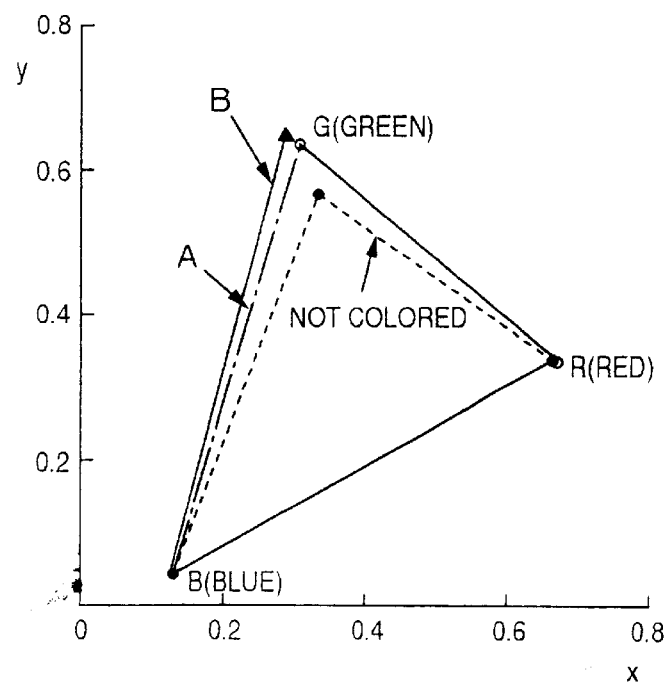
FIG. 19 is a graphic representation for indicating color improving effects achieved by the first embodiment mode of the present invention.

Next, a description will now be made of an improvement effect of the color purity. FIG. 19 is a chromaticity diagram used to explain the enlargement effect of the color representation range, and an ordinate thereof indicates a y value whereas an abscissa thereof denotes an x value. As previously explained, as to the chromaticity points (x,y) of the image light of the projection tube having the characteristics shown in FIG. 7 to FIG. 9, the chromaticity point of the blue image light is (0.126, 0.045); the chromaticity point of the red image light is (0.652, 0.342), and the chromaticity point of the green image light is (0.322, 0.578). The larger the range surrounded by these three points becomes, the greater the color representation range is increased.

Figure 13:
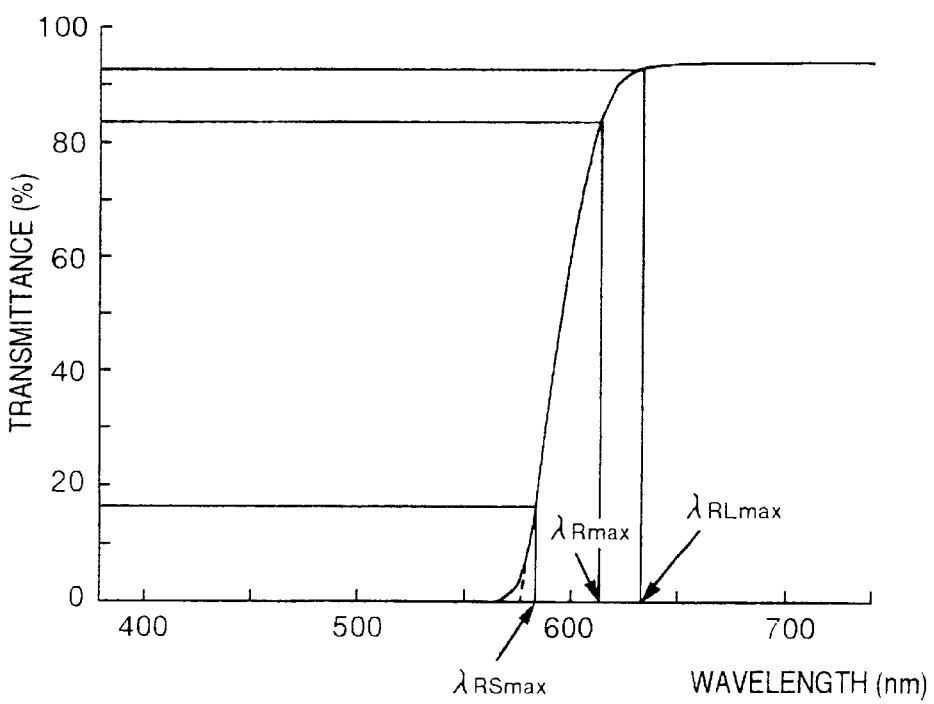
FIG. 13 is a graphic representation for representing a transmittance characteristic of a light transmitting means according to a first embodiment mode of the present invention, employed in the projection lens of the red image light projection tube.

In FIG. 19, a dot and dash line "A" represents the enlargement effect of the color representation range in such a case that as the conventional light transmitting means, the transmittance characteristic shown in FIG. 14 is given to the concave lens element 6 provided in the green image light projection tube, and furthermore, the transmittance characteristic shown in FIG. 12 is given to the concave lens element 6 provided in the red image light projection tube. As a result, the chromaticity point of the green image light is moved to (0.302, 0.639), and also the chromaticity point of the red image light is moved to (0.664, 0.335). Thus, the color representation range is enlarged by 22% (namely, by area ratio), as compared with the color representation range when the concave lens element 6 is not colored. Also, a solid line represents the enlargement effect of the color representation range in such a case that as the light transmitting means according to this embodiment mode, the transmittance characteristic shown in FIG. 15 is given to the concave lens element 6 provided in the green image light projection tube, and furthermore, the transmittance characteristic shown in FIG. 13 is given to the concave lens element 6 provided in the red image light projection tube. As a result, the chromaticity point of the green image light is moved to (0.281, 0.648), and also the chromaticity point of the red image light is moved to (0.667, 0.331). Thus, the color representation range is enlarged by 33% (namely, by area ratio), as compared with the color representation range when the concave lens element 6 is not colored. Accordingly, the color representation range can be greatly improved by +50%, as compared with that of the conventional light transmitting means.

Also, while a raster of 5.33 inches is displayed on the fluorescent face of the projection tube, brightness and values of the cathode currents flowing through the respective projection tubes are given as follows, which are obtained when the three colors, i.e., red, green, blue are mixed on the screen to thereby display an enlarged white-colored image (color temperature being 9300K+0 MPCD, chromaticity point being (0.285, 0.294)) of 60 inches:

First of all, brightness is obtained in such a case that as the conventional light transmitting means, the transmittance characteristic shown in FIG. 14 is given to the concave lens element 6 provided on the green image light projection tube, and furthermore, the transmittance characteristic shown in FIG. 12 is given to the concave lens element 6 provided on the red image light projection tube, namely, 159.5 (nt (=cd/m2)) in a white color; 112 (nt) in a green moro color; 35.5 (nt) in a red mono color; and 12 (nt) in a blue mono color. Also, the cathode currents flowing through the green, red, blue image light projection tubes are 0.42 (mA), 0.31 (mA), and 0.40 (mA), respectively. A total amount of these cathode currents was 1.13 (mA).

On the other hand, brightness is obtained in such a case that as the light transmitting means according to this embodiment mode, the transmittance characteristic shown in FIG. 15 is given to the concave lens element 6 provided on the green image light projection tube, and furthermore, the transmittance characteristic shown in FIG. 13 is given to the concave lens element 6 provided on the red image light projection tube, namely, 158.3 (nt (=cd/m2)) in a white color; 110.3 (nt) in a green moro color; 36.5 (nt) in a red mono color; and 11.5 (nt) in a blue mono color. Also, the cathode current flowing through the green image light projection tube is 0.45 (mA), and therefore is increased by 8%, as compared with that of the prior art. This region is given as follows: That is, since the transmittance with respect to the wavelength $\lambda$ GLmax (=630 nm) of the sub-peak energy in the long-wavelength-sided region within the emission spectrum of the green fluorescent substance is reduced by a half value, as compared with that of the prior art, a shortage of the brightness is compensated by supplying an excessive amount of the cathode current. Also, the cathode current flowing through the red image light projection tube is 0.335 (mA), and thus is increased by 8%, as compared with that of the prior art. This reason is given as follows: That is, since the transmittance with respect to the wavelength $\lambda$ RSmax (=585 nm) of the sub-peak energy in the short-wavelength-sided region rather than the main wavelength $\lambda$ Rmax (=615 nm) within the emission spectrum of the red fluorescent substance is reduced by a half value, as compared with that of the prior art, and also the transmittance of the main wavelength $\lambda$ Rmax (=615 nm) is lowered by approximately 2% as to the absolute value thereof, a shortage of the brightness is compensated by supplying an excessive amount of the cathode current. Also, the cathode current flowing through the blue image light projection tube may be 0.5 (mA), and therefore can be reduced by 13%, as compared with that of the prior art, because the color purities of the red image light and of the green image light are improved, and thus the distributed cathode current for this blue image light projection tube can be reduced. Then, as previously explained, a total amount of the cathode currents for the green, red, blue images light projection tubes becomes 1.14 (mA).

As previously explained in detail, in accordance with this embodiment mode, the focus performance can be greatly improved and also the color representation range can be largely enlarged without increasing the total amount of the cathode currents as well as without lowering the brightness, as compared with the prior art.

To enlarge the color reproduction range and to improve the focus performance by increasing the color purities of the image light, a light transmitting means according to another embodiment mode of the present invention is provided with the screen 8 shown in FIG. 2 and FIG. 3.

Figure 20:
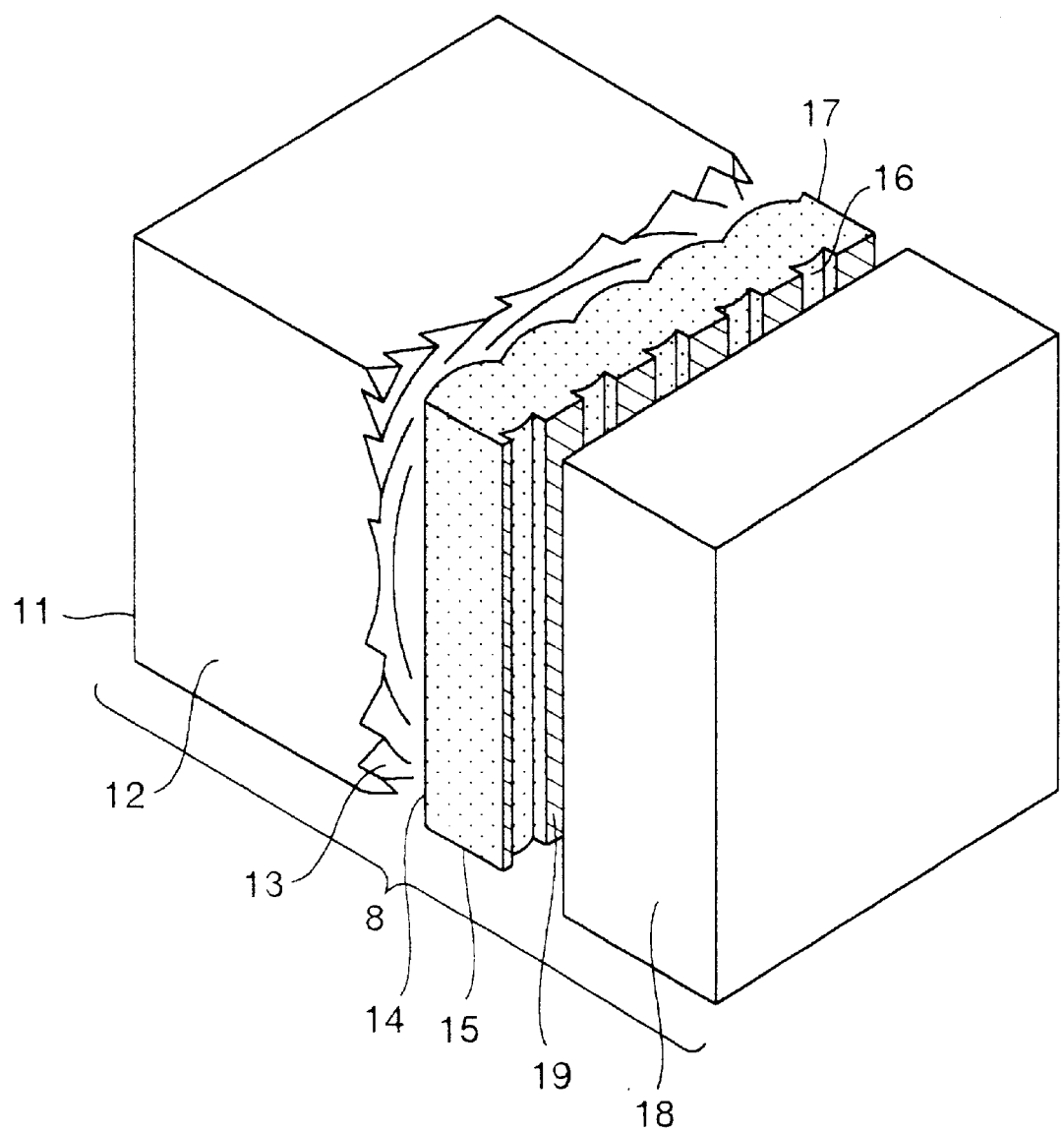
FIG. 20 is a perspective view for indicating a major portion of a projection optical system according to a second embodiment mode of the present invention.

FIG. 20 is a perspective view for indicating a projection optical system according to another embodiment of the present invention. This drawing is related to the screen 8 shown in FIG. 2 and FIG. 3. In this drawing, reference numeral 11 shows a light incident plane; reference numeral 12 denotes a Fresnel lens sheet; reference numeral 13 indicates a Fresnel lens; reference numeral 14 represents a longitudinal lenticular lens; reference numeral 15 shows a lenticular sheet; 16 represents a longitudinal lenticular lens; 17 is a light diffusion material; reference numeral 18 indicates a front sheet; and reference numeral 19 denotes a light absorption layer.

In this drawing, this transmission type screen 8 is made of a three-group structure constituted by the Fresnel lens sheet 11, the lenticular sheet 15, and the front sheet 18. The Fresnel lens sheet 11 converts the enlarged image light which is derived from the projection lens 6 shown in FIG. 1 and FIG. 2 and is entered from the light incident plane 11 into substantially parallel image light by the Fresnel lens 13 formed on the light projection plane side thereof. The lenticular sheet 15 is made of the light diffusion material 17. The longitudinal lenticular lenses 14 and 16 are formed at a light incident plane 14 thereof and a light projection plane 16 thereof in correspondence thereto. The light absorption layer 19 is formed between the lenticular sheet 15 and the longitudinal lenticular lens 16 on the light projection plane along the longitudinal direction. The substantially parallel image light projected from the Fresnel lens sheet 11 is collected every the longitudinal lenticular lens 14 on the light incident side of the lenticular sheet 15, and then the collected image light is projected from the longitudinal lenticular lens 16 on the light projection side, so that this collected image light is diffused along the horizontal direction of the screen, and also is diffused along the vertical direction of the screen by way of the light diffusion material 17 diffused within the lenticular sheet 15.

In this embodiment mode, the front sheet 18 is further provided on the front plane (namely, observer side) of the lenticular sheet 15. As a result, the ambient light for lowering the contrast can be reduced.

Figure 21:
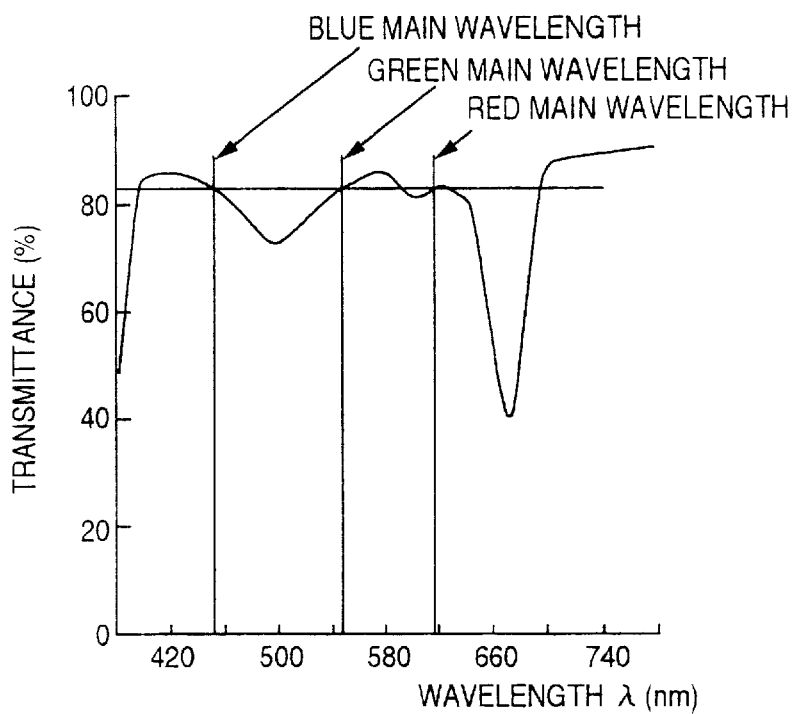
FIG. 21 is a graphic representation for showing one example of a transmittance characteristic of a light selecting/transmitting means on a front sheet in FIG. 20.
Figure 22:
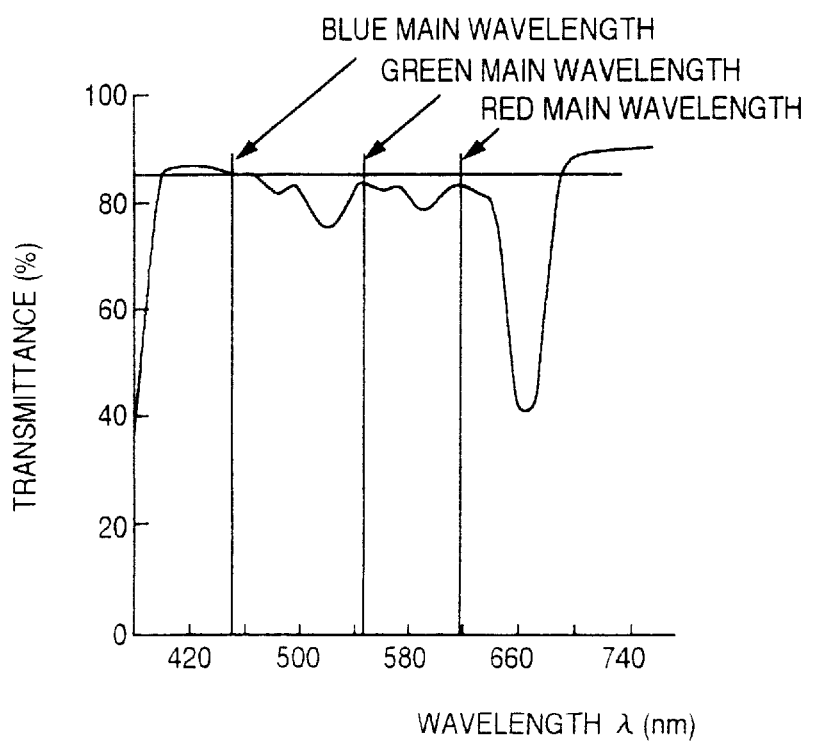
FIG. 22 is a graphic representation for showing another example of a transmittance characteristic of a light selecting/transmitting means on a front sheet in FIG. 20.

The image light which has been diffused along the horizontal and vertical directions by the lenticular sheet 15 is projected via the front sheet 18 to the external side, so that the image may be observed from the external side. The transmittance characteristics as indicated in FIG. 21 and FIG. 22 are given to this front sheet 18. In other words, the transmittance in the short wavelength region rather than the main wavelength $\lambda$ Bmax of the peak energy in the emission spectral distribution of the blue image light is set to be larger than the transmittance TBmax in the main wavelength $\lambda$ Bmax of this peak energy. Also, the transmittance in the long wavelength region rather than the main wavelength $\lambda$ Rmax of the peak energy in the emission spectral distribution of the red image light is set to be smaller than the transmittance TRmax in the main wavelength $\lambda$ Rmax of this peak energy. Furthermore, while suppressing the transmittance in the wavelength region between the main wavelength $\lambda$ Bmax of the blue image light, and the main wavelength $\lambda$ Gmax of the green image light, and also the transmittance between the main wavelength $\lambda$ Gmax of the green image line and the main wavelength $\lambda$ Rmax of the red image light, the transmittance in the main wavelengths $\lambda$ Bmax, $\lambda$ Rmax, $\lambda$ Gmax of the respective image light is made substantially equal to each other.

A portion of the ambient light such as illumination light in a room passes through the front sheet 18, and a portion of the passed ambient light is absorbed by the light absorption layer 19 provided on the light projection face side of the lenticular sheet 15. Another portion of this passed ambient light is reflected on the longitudinal lenticular lens 16 provided on the light projection face side of the lenticular sheet 15, and on the longitudinal lenticular lens 14 provided on the light incident face side, and then the reflected image light passes through the front sheet 18 to be returned to the external side. This returned ambient light may constitute one of the reasons for lowering the contract performance by being superimposed with the image light projected from the front sheet 18. In accordance with this embodiment mode, as indicated in FIG. 21 of FIG. 22, while the transmittance is lowered in the wavelength regions among the main wavelengths $\lambda$ Bmax, $\lambda$ Rmax, $\lambda$ Gmax of the image light, the light components of the ambient light are attenuated two times at the light incident face of the front sheet 18 and also at the light projection face thereof within these wavelength regions. As a consequence, the ambient light which is reflected on the lenticular sheet 15 and the like and then is returned via the front sheet 18 can be sufficiently lowered, so that lowering of the contrast performance can be largely suppressed, as compared with that of the prior art.

As previously explained, in accordance with this embodiment mode, since the front sheet 18 having the transmittance characteristic shown in FIG. 21 or FIG. 22 is employed, the adverse influence caused by the ambient light can be suppressed, so that lowering of the contrast performance can be considerably reduced. Moreover, since the transmittance characteristic owned by this front sheet 18 does not impede passing of the image light, this transmittance characteristic gives no adverse influence to the color tone of the image displayed on the projection image display apparatus.

Figure 23:
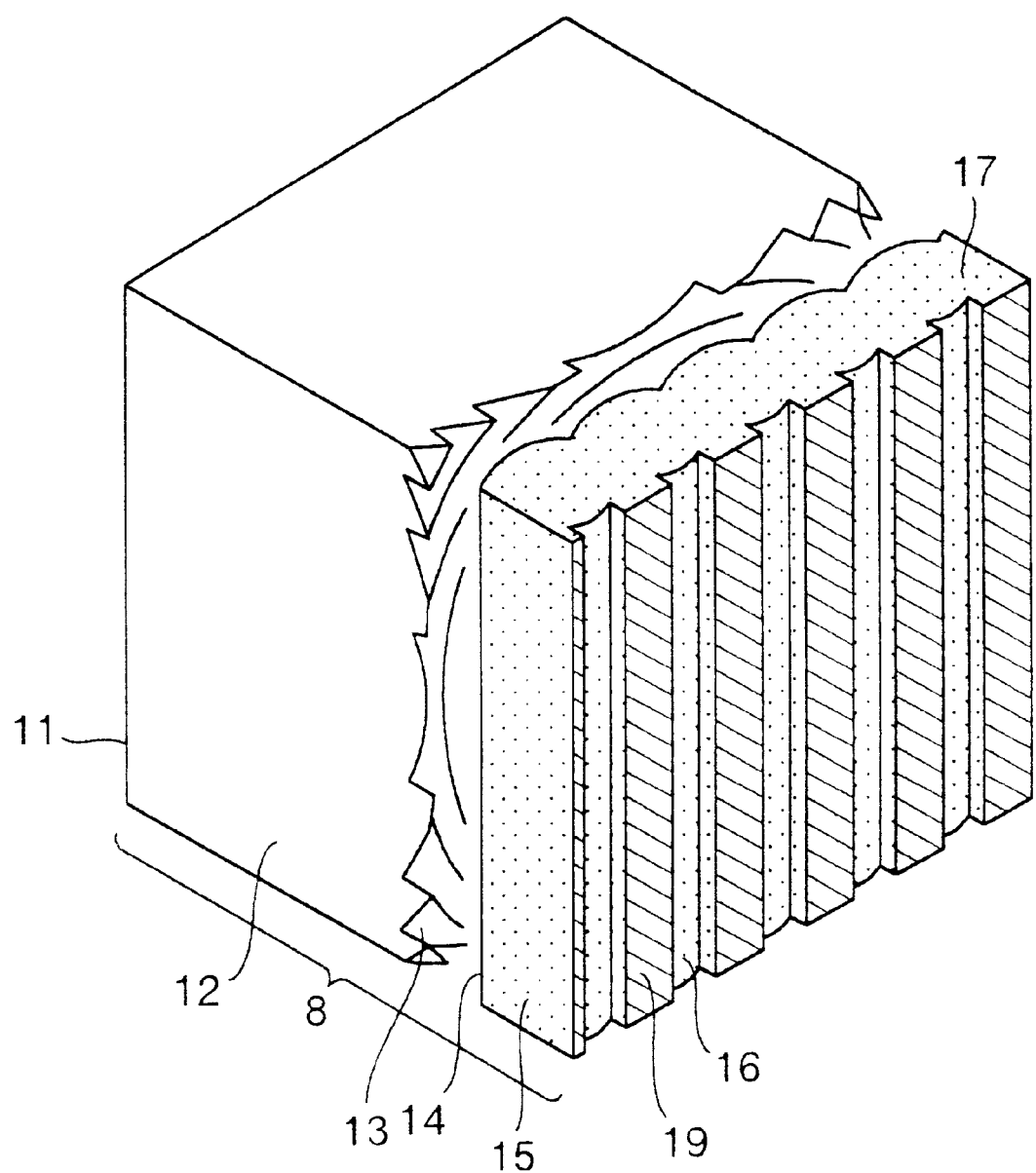
FIG. 23 is a perspective view for representing a major portion of a projection optical system according to a third embodiment mode of the present invention.

FIG. 23 is a perspective view for representing a projection optical system according to a further embodiment mode of the present invention, and also is related to the screen 8 shown in FIG. 2 and FIG. 3. It should be noted that the same reference numerals shown in FIG. 20 will be employed as those for denoting the corresponding elements in FIG. 23, and explanations thereof are omitted.

In this drawing, according to this embodiment mode, the screen 8 is a two-group structure constituted by a Fresnel lens 11 and a lenticular sheet 15. The Fresnel lens sheet 11 and the lenticular sheet 15 own the same functions as those of the above-described Fresnel lens sheet 11 and lenticular sheet 15 shown in FIG. 20. Furthermore, the transmittance characteristics indicated in FIG. 21 and FIG. 22 are given to this lenticular sheet 15.

With the above-explained structure, a portion of the ambient light is absorbed by the light absorption layer 19, whereas another portion of this ambient light is entered from a portion of an exposed longitudinal lenticular lens 16 into the lenticular sheet 15, and then passes through this lenticular sheet 15. The resulting ambient light portion is reflected on the face of the longitudinal lenticular lens 14, or the face of the Fresnel lens 13 of the Fresnel lens sheet 13 provided on the light incident plane side, and then the reflected ambient light portion again passes through the lenticular sheet 15. The ambient light which has passed through this lenticular sheet 15 is projected from the portion of the exposed longitudinal lenticular lens 16 provided at the light project face side, which is superimposed with the image light projected from the lenticular sheet 15. Thus, this causes one of the reasons for lowering the contrast performance. However, in accordance with this embodiment mode, since this ambient light is attenuated two times in the reciprocation way by the lenticular sheet 15, it is possible to greatly reduce lowering of the contrast performance by this ambient light. Moreover, since the transmittance characteristic owned by this lenticular sheet 15 does not impede passing of the image light, this transmittance characteristic gives no adverse influence to the color tone of the image displayed on the projection image display apparatus.

As previously explained, according to the present invention, both the focus performance and the contrast performance can be improved without lowering the brightness of the displayed image, and also the quality of the displayed image can be increased.

What is claimed is:
1. A projection image display apparatus comprising:
a plurality of image generating sources for generating three primary colors, including red, green, and blue image light, respectively; and a projection lens containing a plurality of lens elements provided in correspondence with each of said image generating sources, for enlarging/projecting images displayed by said image generating sources onto a screen, wherein:
said screen is equipped with a sheet-shaped member for transmitting image light generated from each of said plurality of image generating sources, and a light transmittance of said sheet-shaped member corresponding in close proximity to $\lambda$ Rmax of peak energy in a spectral distribution of said red image light, λ Bmax of peak energy in a spectral distribution of said blue image light and λ Gmax of peak energy in a spectral distribution of said green image light is at least larger than the light transmittance compared to a wavelength between said λ Bmax and λ Gmax, and a frequency between said λ Rmax and λ Gmax.

2. A projection image display apparatus as claimed in claim 1 wherein:

said sheet-shaped member is arranged on a light projection side of the image light of said screen.

3. A projection image display apparatus as claimed in claim 1 wherein:

a transmittance of said sheet-shaped member is substantially equal to a transmittance of each of said wavelengths λ Rmax, λ Bmax, and λ Gmax of said peak energy.

4. A screen used in a projection image display apparatus, on which three primary colors, including red, green, and blue image light generated from a plurality of image generating sources are enlarged/projected respectively, comprising:

a sheet-shaped member for transmitting image light generated from each of said plurality of image generating sources, a light transmittance of said sheet-shaped member concerned with close proximity to λ Rmax of peak energy in a spectral distribution of said red image light, λ Bmax of peak energy in a spectral distribution of said blue image light and λ Gmax of peak energy in a spectral distribution of said green image light is at least larger than the light transmittance compared to a wavelength between said λ Bmax and λ Gmax, and a frequency between said λ Rmax and λ Gmax.

5. A screen as claimed in claim 4 wherein:

said sheet-shaped member is arranged on a light projection side of the image light.

6. A screen as claimed in claim 4 wherein:

transmittance of said sheet-shaped member is substantially equal to transmittance of each of said wavelengths λ Rmax, λ Bmax, and λ Gmax of said peak energy.

7. A projection image display according to claim 1, wherein all the light transmittance of said sheet-shaped member in close proximity to λ Rmax, λ Bmax and λ Gmax is more than 80%.

8. A projection image display according to claim 1, wherein said sheet-shaped material includes a Fresnel sheet on which a Fresnel lens is formed, and a lenticular sheet on which a lenticular lens is formed and a front sheet are disposed in the direction of propagation of said image light, and said front sheet is provided with said characteristic.

9. A projection image display according to claim 1, wherein the light transmittance larger than that of said λ Rmax and less than a wavelength of 700 nm is made smaller than that of a wavelength between said λ Bmax and λ Gmax, and a frequency between said λ Rmax and λ Gmax.

10. A screen according to claim 4, wherein all the light transmittance of said sheet-shaped material in close proximity to said λ Rmax, λ Bmax and λ Gmax is more than 80%.

11. A screen according to claim 4, wherein said sheet-shaped material includes a Fresnel sheet on which a Fresnel lens is formed, and a lenticular sheet on which lenticular lens is formed and a front sheet are disposed in the direction of propagation of said image light, and said front sheet is provided with said characteristic.

12. A screen according to claim 4, wherein the light transmittance larger than that of said λ Rmax and less than a wavelength of 700 nm is made smaller than that of a wavelength between said λ Bmax and λ Gmax, and a frequency between said λ Rmax and λ Gmax.

13. A projection image display apparatus comprising an image generating source for generating image light, and a projection lens for enlarging/projecting images displayed by said image generating sources onto a screen;

wherein said screen including a sheet-shaped member for transmitting image light generated from said image generating source, and light transmittance of said sheet-shaped member concerned with close proximity to λ Rmax of peak energy in a spectral distribution of said red image light, λ Bmax of peak energy in a spectral distribution of said blue image light and λ Gmax of peak energy in a spectral distribution of said green image light is at least larger than the light transmittance compared to wavelength between said λ Bmax and λ Gmax, and frequency between said λ Rmax and λ Gmax.

14. A screen used in a projection image display apparatus, on which image light generated from a plurality of image generating source is enlarged/projected respectively, wherein said screen including a sheet-shaped member for transmitting image light generated from said image generating source, and light transmittance of said sheet-shaped member concerned with close proximity to λ Rmax of peak energy in a spectral distribution of said red image light, λ Bmax of peak energy in a spectral distribution of said blue image light and λ Gmax of peak energy in a spectral distribution of said green image light is at least larger than the light transmittance compared to wavelength between said λ Bmax and λ Gmax, and frequency between said λ Rmax and λ Gmax.

* * * * *